(12) United States Patent
Hagari

(10) Patent No.: US 11,105,280 B2
(45) Date of Patent: Aug. 31, 2021

(54) CONTROLLER AND CONTROL METHOD FOR INTERNAL COMBUSTION ENGINE

(71) Applicant: Mitsubishi Electric Corporation, Tokyo (JP)

(72) Inventor: Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/085,463

(22) Filed: Oct. 30, 2020

(65) Prior Publication Data

US 2021/0047972 A1    Feb. 18, 2021

Related U.S. Application Data

(62) Division of application No. 16/257,353, filed on Jan. 25, 2019, now Pat. No. 10,961,924.

(30) Foreign Application Priority Data

Feb. 23, 2018   (JP) .................................. 2018-030341

(51) Int. Cl.
*F02D 35/02* (2006.01)
*G01L 23/24* (2006.01)
(Continued)

(52) U.S. Cl.
CPC ......... *F02D 35/028* (2013.01); *F02D 35/024* (2013.01); *F02D 37/02* (2013.01);
(Continued)

(58) Field of Classification Search
CPC .. F02D 35/028; F02D 41/1405; F02D 41/005; F02D 35/024; F02D 37/02;
(Continued)

(56) References Cited

U.S. PATENT DOCUMENTS 4,843,870 A * 7/1989 Citron ................. F02D 41/1498
73/114.15
5,546,793 A * 8/1996 Gimmler .................. G01L 3/00
701/110
(Continued)

FOREIGN PATENT DOCUMENTS

JP      11-351045 A    12/1999
JP      5644733 B2    12/2014
JP      6190936 B1     8/2017

OTHER PUBLICATIONS

Yoshida Motohiro, et al., "Application of model base calibration in direct injection diesel engine", The Mazda Motor Technical Report, 2006, No. 24, 19 pages.
(Continued)

*Primary Examiner* — Joseph J Dallo
*Assistant Examiner* — Kurt Philip Liethen
(74) *Attorney, Agent, or Firm* — Sughrue Mion, PLLC; Richard C. Turner

(57) ABSTRACT

To provide a controller and a control method for an internal combustion engine capable of performing automatic adaptation of the optimal ignition timing or the optimal control value of the combustion operation mechanism during operating. A controller and a control method for an internal combustion engine changes setting values of a torque characteristics function so that an output torque calculated using the torque characteristics function approaches an output torque calculated based on an actual value of internal cylinder pressure; calculates a plurality of output torques corresponding to respective plurality of combustion control states using the torque characteristics function; and changes setting values of a combustion control target setting function so that a target value of combustion control state calculated using the combustion control target setting function
(Continued)

approaches a maximum torque combustion control state where the output torque becomes the maximum.

3 Claims, 12 Drawing Sheets

(51) Int. Cl.
    *F02D 41/00*     (2006.01)
    *F02D 37/02*     (2006.01)
    *F02P 5/153*     (2006.01)
    *F02P 5/04*     (2006.01)
    *F02D 41/14*     (2006.01)

(52) U.S. Cl.
    CPC ....... *F02D 41/005* (2013.01); *F02D 41/1405* (2013.01); *F02P 5/045* (2013.01); *F02P 5/153* (2013.01); *G01L 23/24* (2013.01); *F02D 2200/101* (2013.01); *F02D 2200/1002* (2013.01); *F02D 2200/1012* (2013.01); *F02D 2250/18* (2013.01); *F02D 2250/28* (2013.01)

(58) Field of Classification Search
    CPC ......... F02D 2200/1002; F02D 2250/18; F02D 2200/101; F02D 2200/1012; F02D 2250/28; F02P 5/153; F02P 5/045; F02P 5/1502; G01L 23/24; G01L 1/183; Y02T 10/40

See application file for complete search history.

(56) References Cited

U.S. PATENT DOCUMENTS

| | | | |
|---|---|---|---|
| 6,223,120 B1* | 4/2001 | Williams | G01M 15/11 701/102 |
| 10,344,704 B2* | 7/2019 | Ottikkutti | F02D 41/403 |
| 2008/0105233 A1* | 5/2008 | Koeller | F02D 35/024 123/435 |
| 2008/0125929 A1* | 5/2008 | Prokhorov | F02D 41/009 701/31.4 |
| 2009/0282903 A1* | 11/2009 | Nagano | F02D 41/0097 73/114.15 |
| 2018/0087459 A1 | 3/2018 | Hagari et al. | |
| 2019/0170071 A1* | 6/2019 | Hashizume | F02D 41/1446 |
| 2019/0218986 A1* | 7/2019 | Yamaguchi | F02D 41/0275 |
| 2019/0218992 A1* | 7/2019 | Yamaguchi | F02M 26/15 |
| 2020/0011262 A1* | 1/2020 | Eser | F02D 41/0085 |

OTHER PUBLICATIONS

Takayuki Okaya, "Machine Learning Professional Series—Deep Learning", Kodansha, 2015, 5 pages.

\* cited by examiner

CONTROLLER AND CONTROL METHOD FOR INTERNAL COMBUSTION ENGINE

INCORPORATION BY REFERENCE

This is a divisional application of U.S. patent application Ser. No. 16/257,353, filed Jan. 25, 2019, in the U.S. Patent and Trademark Office, which claims priority from Japanese Patent Application No. 2018-30341 filed on Feb. 23, 2018, which are incorporated herein by reference in their entireties.

BACKGROUND

The present disclosure relates to a controller and a control method for an internal combustion engine for controlling the internal combustion engine by setting output torque as control objective.

Recently, a controller and a control method for the internal combustion engine has been proposed to use an output torque of the internal combustion engine which is a physical value acting on vehicle control directly, as a request value of the internal combustion engine output received from a driver and each vehicle system (motor control for hybrid vehicle, transmission control, brake control, traction control, and the like); and to determine air amount, fuel amount, ignition timing, and the like which are controlled variables of the internal combustion engine by setting the output torque as a target value of the internal combustion engine output; and to realize cooperative control and obtain good travel performance by estimating actual output torque based on the actual driving conditions of internal combustion engine and transmitting to each vehicle system.

Although such a control method is generally called torque base control, in this control method, it is important that the actual output torque can be calculated with good accuracy based on the driving conditions of internal combustion engine. If this can be achieved, by inverse calculation of this, target values of the controlled variables of internal combustion engine (for example, a throttle opening degree, an EGR opening degree, an ignition timing, an air-fuel ratio, and the like) can be calculated from the target torque.

For example, in JP 5644733 B, as the target torque in torque base control, there are a low response target torque and a high response target torque which are different in response. In JP 5644733 B, operation of air amount such as throttle control is performed so as to realize the low response target torque, and operation of ignition timing or fuel injection amount is performed so as to realize the high response target torque. In more detail, MBT ignition timing to the driving condition of the internal combustion engine, a thermal efficiency in MBT, a reduction rate of torque to a retard amount from MBT, and the like are stored in many map data; further, correction by an EGR amount and an air-fuel ratio is performed if needed; by combining these, a calculation of actual torque and a control capable of corresponding to a low response target torque and a high response target torque are configured.

By the way, as a method to estimate the output torque from the driving condition of the internal combustion engine, besides the above calculation method using the map data, a method adapting a neural network technology like JP H11-351045 A is also proposed, for example. Here, the neural network is the mathematical model which aimed at expressing several characteristics observed in the brain function by simulation on a computer. By making a feedforward propagation type neural network (FNN: Feedforward Neural Network) learn previously using output value to input values as teacher data, it can be used as a general-purpose approximation function which simulates a relation between the input values and the output value which were learned. As a learning method of the neural network, the error back propagation method (back propagation method) is generally known.

In order to improve the fuel consumption performance and the emission performance of the internal combustion engine, a method of measuring the combustion condition of the internal combustion engine and carrying out feedback control of the measuring result is effective. For that purpose, it is important to measure the combustion condition of the internal combustion engine accurately. It is known widely that the combustion condition of the internal combustion engine can be measured accurately by measuring a cylinder internal pressure. If a sensor which measures the internal cylinder pressure directly is used (hereinafter, referred to as a cylinder internal pressure sensor), the internal cylinder pressure can be measured. However, since the cylinder internal pressure sensor is expensive and it is not easy to secure durability, a method for detecting the internal cylinder pressure without using the cylinder internal pressure sensor has also been developed. For example, in the technology disclosed in JP 6190936 B, it is configured to calculate a crank angle speed and a crank angle acceleration based on an output signal of a crank angle sensor, calculate a combustion gas pressure torque generated by combustion based on the crank angle speed and the crank angle acceleration, and estimate a combustion state such as an internal cylinder pressure (hereinafter, cylinder internal pressure information) by the combustion gas pressure torque.

SUMMARY

To a mechanism for internal combustion engine control which becomes complex for recent improvement in fuel efficiency, an internal combustion engine control system also becomes complex similarly, and an increase of the adaptation man hours becomes a large problem. As an example of the mechanism for internal combustion engine control which becomes complex, the intake and exhaust VVT (Variable Valve Timing), a variable valve lift, the variable compression ratio, a turbocharger, a swirl control valve, a tumble control valve, and the like are known. In the case of the control method using map data as JP 5644733 B, if the mechanism for internal combustion engine control becomes complex, many map data is required correspondingly, and accordingly, the adaptation man hours also increase. In a viewpoint of an experiment of internal combustion engine necessary for adaptation, a commercially available MBC (Model Based Calibration) tool has been developed in recent years. For example, as shown in "Application of model base calibration in direct injection diesel engine", Motonori Yoshida, the Mazda Motor technical report, No. 24 (2006), in this tool, a test plan of internal combustion engine is planned based on DOE (Design of Experiments), data collection is performed in conjunction with a testing equipment of internal combustion engine, a statistic model of internal combustion engine is created from its result, and a map data used for control based on this model is created.

However, although map data can be created by MBC tool, in order to create many map data, corresponding man hours are required and many man hours are required also for managing its data for every model of the internal combustion engine. Furthermore, if the map data for control is created from the statistic model of MBC tool, since it is considered that the number of parameters of the driving condition of internal combustion engine which can be considered is decreased and accuracy is deteriorated, many man hours are required also for checking of control accuracy using this map data and fine tuning. In this way, in the conventional map control, even though MBC tool is introduced, there is a problem that still enormous adaptation man hours are required.

About the method to estimate the output torque from the driving condition of internal combustion engine using the feedforward propagation type neural network (FNN) like JP H11-351045 A, in the conventional method only with one middle layer, there is a problem that sufficient accuracy cannot be obtained even if FNN is used as the approximation function. In the viewpoint of approximate precision, a method called deep learning is known in recent years. For example, as shown in "Machine learning professional series deep learning", Takayuki Okaya, Kodansha, 2015, by multi-layering (deep layering) the neural network similar to the conventional one, this method can improve accuracy as the approximation function significantly. While learning could not be well performed due to the vanishing gradient problem and the like in the conventional learning method, learning came to be well performed by developed various learning techniques in recent years. This deep learning is known also as the one method of the artificial intelligence (AI) and the machine learning which attract attention in recent years.

Then, if the output torque is estimated from the driving condition of internal combustion engine using FNN as the approximation function, it is considered that by creating teacher data with MBC tool and learning it, the output torque can be well estimated by minimum adaptation man hours. Furthermore, since a neural network may be used as one of the methods of creating the statistical model of internal combustion engine also in MBC tool, the output torque can also be estimated from the driving condition of internal combustion engine using the statistical model of internal combustion engine itself created by MBC tool; in this case, man hours are further reduced.

By the way, if ignition timing and control values of combustion operation mechanisms which operate the combustion state of internal combustion engine is set to the optimum values considering fuel efficiency and exhaust gas by MBC tool, even though its setting values are the optimum values for the individual of the internal combustion engine which is used for adaptation, when it applies to the internal combustion engines of mass production, since each of the internal combustion engine has individual variation, it is not always the optimum value. Furthermore, when the internal combustion engine is used over a long time, it is considered the case where the optimum value changes by aging change such as accumulation of deposit and abrasion also in the internal combustion engine which is used for adaptation. In this case, if the internal cylinder pressure information can be detected using the method of JP 6190936 B or the cylinder internal pressure sensor, it is considered that automatic adaptation can be performed to the optimal setting values corresponding to the individual of the internal combustion engine based on these during running. However, in the case where the internal cylinder pressure information can be detected, a method to search for the optimum values of the ignition timing and the control values of the control mechanisms of internal combustion engine during running, store it, and use for control is not described from JP 5644733 B to JP 6190936 B; and a concrete method is not disclosed.

Thus, it is desired to provide a controller and a control method for an internal combustion engine capable of performing automatic adaptation of the optimal ignition timing or the optimal control value of the combustion operation mechanism during operating, even though variation occurs in a characteristics of the internal combustion engine according to individual differences of the internal combustion engines, aging change, and the like.

A first controller for an internal combustion engine according to the present disclosure including:

a driving condition detection unit that detects driving conditions of the internal combustion engine including an internal cylinder pressure which is a pressure in a combustion chamber;

a combustion control target calculation unit that calculates a target value of a combustion control state, by using a combustion control target setting function in which a relationship between preliminarily set kinds of driving conditions and the target value of the combustion control state which is a control state of a combustion operation mechanism for operating combustion state is set;

a combustion control unit that controls the combustion operation mechanism, based on the target value of the combustion control state;

an actual torque calculation unit that calculates an output torque corresponding to present driving conditions, by using a torque characteristics function in which a relationship between preliminarily set kinds of driving conditions including the combustion control state and the output torque of the internal combustion engine is set;

a torque characteristics learning unit that calculates an output torque based on an actual value of the internal cylinder pressure, and changes setting values of the torque characteristics function so that the output torque calculated using the torque characteristics function approaches the output torque calculated based on the actual value of the internal cylinder pressure; and a combustion control target learning unit that calculates a plurality of output torques corresponding to respective plurality of the combustion control states using the torque characteristics function, calculates a maximum torque combustion control state which is the combustion control state where the output torque becomes the maximum within a range of the plurality of combustion control states, based on the plurality of combustion control states and the plurality of output torques, and changes setting values of the combustion control target setting function so that the target value of the combustion control state calculated using the combustion control target setting function approaches the maximum torque combustion control state.

A second controller for an internal combustion engine according to the present disclosure including:

a driving condition detection unit that detects driving conditions of the internal combustion engine including an internal cylinder pressure which is a pressure in a combustion chamber;

a target ignition timing calculation unit that calculates a basic value of target ignition timing corresponding to present driving conditions, by using an ignition timing setting function in which a relationship between preliminarily set kinds of driving conditions and the basic value of target ignition timing is set;

an ignition control unit that performs feedback control which changes ignition timing based on an actual value of the internal cylinder pressure; and an ignition setting learning unit that changes setting values of the ignition timing setting function so that the basic value of target ignition timing calculated using the ignition timing setting function approaches the ignition timing changed by the feedback control.

A first control method for an internal combustion engine according to the present disclosure including:

a driving condition detection step that detects driving conditions of the internal combustion engine including an internal cylinder pressure which is a pressure in a combustion chamber;

a combustion control target calculation step that calculates a target value of a combustion control state, by using a combustion control target setting function in which a relationship between preliminarily set kinds of driving conditions and the target value of the combustion control state which is a control state of a combustion operation mechanism for operating combustion state is set;

a combustion control step that controls the combustion operation mechanism, based on the target value of the combustion control state;

an actual torque calculation step that calculates a output torque corresponding to present driving conditions, by using a torque characteristics function in which a relationship between preliminarily set kinds of driving conditions including the combustion control state and the output torque of the internal combustion engine is set;

a torque characteristics learning step that calculates an output torque based on an actual value of the internal cylinder pressure, and changes setting values of the torque characteristics function so that the output torque calculated using the torque characteristics function approaches the output torque calculated based on the actual value of the internal cylinder pressure; and a combustion control target learning step that calculates a plurality of output torques corresponding to respective plurality of the combustion control states using the torque characteristics function, calculates a maximum torque combustion control state which is the combustion control state where output torque becomes the maximum within a range of the plurality of combustion control states, based on the plurality of combustion control states and the plurality of output torques, and changes setting values of the combustion control target setting function so that the target value of the combustion control state calculated using the combustion control target setting function approaches the maximum torque combustion control state.

A second control method for an internal combustion engine according to the present disclosure including:

a driving condition detection step that detects driving conditions of the internal combustion engine including an internal cylinder pressure which is a pressure in a combustion chamber;

a target ignition timing calculation step that calculates a basic value of target ignition timing corresponding to present driving conditions, by using an ignition timing setting function in which a relationship between preliminarily set kinds of driving conditions and the basic value of target ignition timing is set;

an ignition control step that performs feedback control which changes ignition timing based on an actual value of the internal cylinder pressure; and an ignition setting learning step that changes setting values of the ignition timing setting function so that the basic value of target ignition timing calculated using the ignition timing setting function approaches the ignition timing changed by the feedback control.

According to the first controller and the first control method for the internal combustion engine, even when variation occurs in torque characteristics according to the individual difference of the internal combustion engine and the aging change, the torque characteristics function can be learned by the output torque calculated by the actual value of internal cylinder pressure during driving. Then, by perturbating the combustion control state and calculating the plurality of the output torques using the torque characteristics function which learned variation of the torque characteristics, the maximum torque combustion control state which is a control state of the combustion operation mechanism where the output torque becomes the maximum can be searched. Then, by learning the combustion control target setting function by the maximum torque combustion control state, the target value of the combustion control state which is adapted to the varied torque characteristics can be set, and the internal combustion engine can be controlled appropriately.

According to the second controller and the second control method for the internal combustion engine, even when variation occurs in ignition timing characteristics according to the individual difference of the internal combustion engine and the aging change, the optimal ignition timing at which the combustion state becomes a desired state is set by performing feedback control of the ignition timing based on the actual value of internal cylinder pressure. Then, by learning the ignition timing setting function by the ignition timing changed by feedback control, the basic value of target ignition timing which is adapted to the varied ignition timing characteristics can be set, and the internal combustion engine can be controlled appropriately.

DETAILED DESCRIPTION OF THE EMBODIMENTS

Embodiment 1

Figure 1:
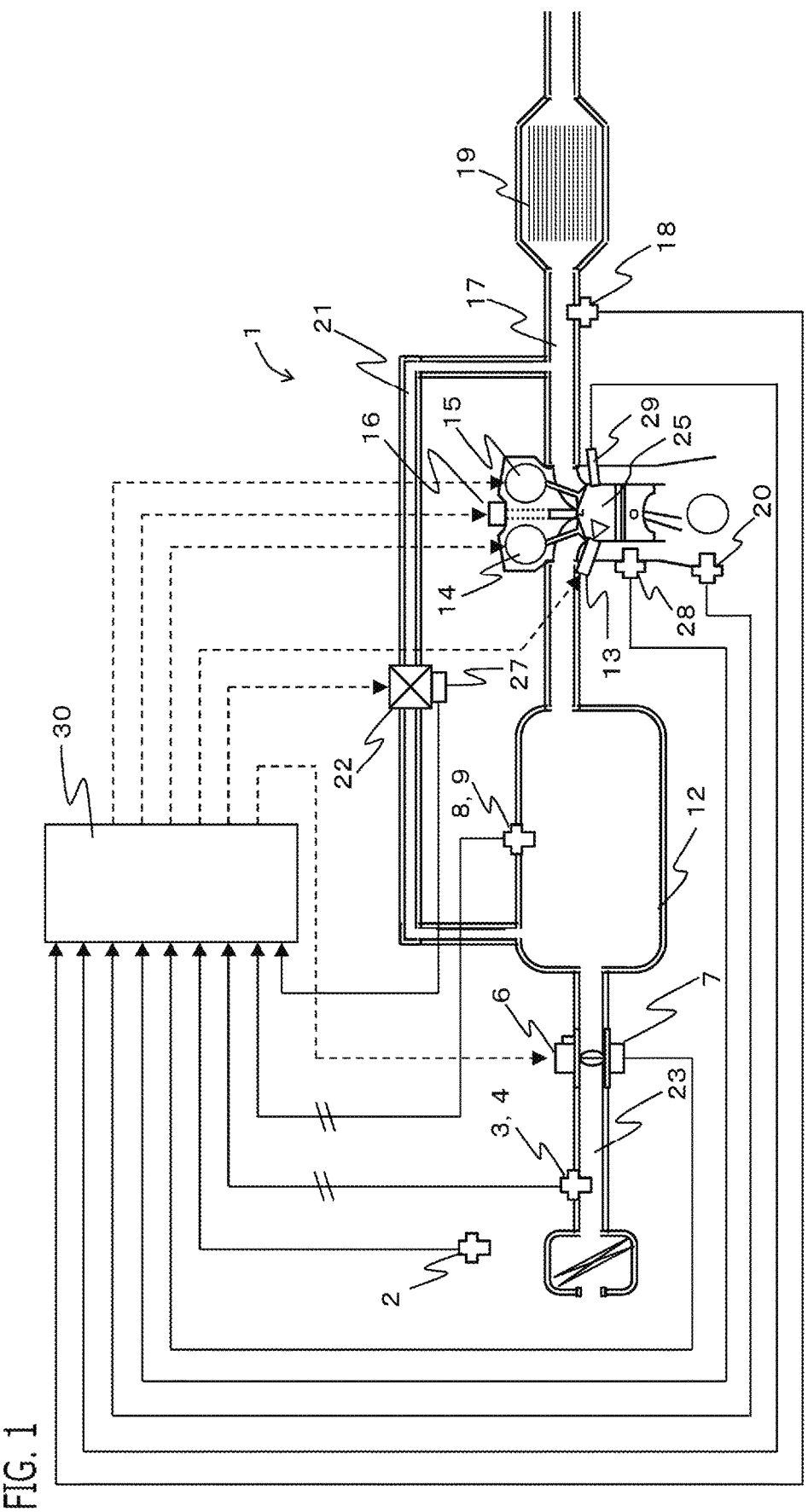
FIG. 1 is a schematic configuration diagram of an internal combustion engine and a controller according to Embodiment 1.
Figure 2:
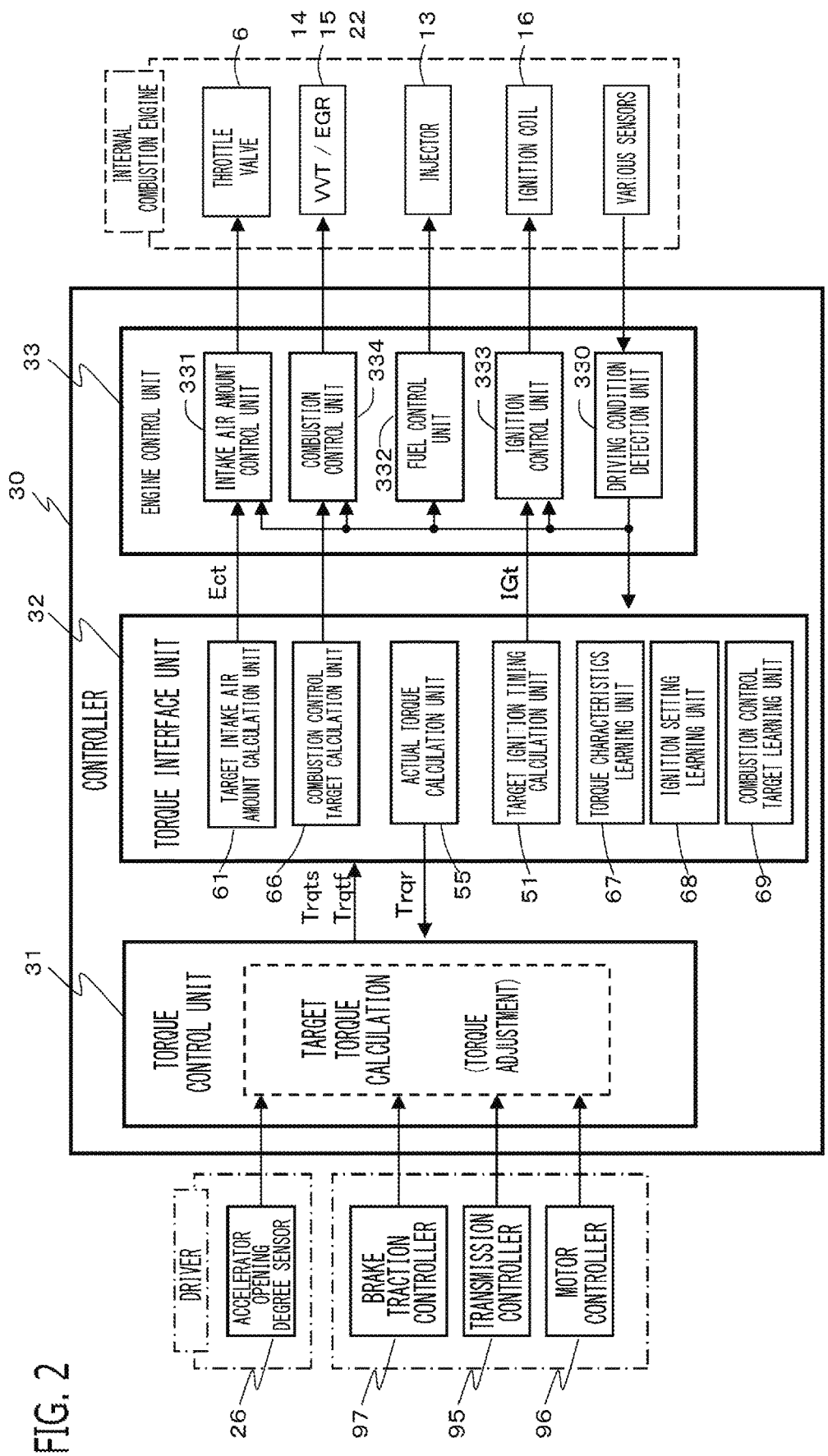
FIG. 2 is a schematic block diagram of a controller according to Embodiment 1.
Figure 3:
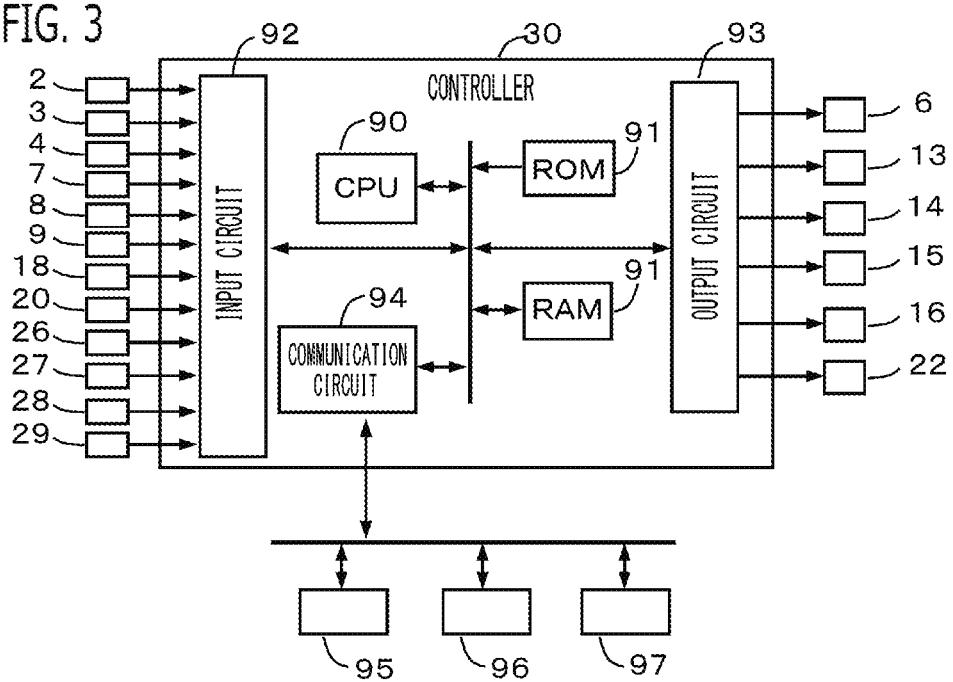
FIG. 3 is a hardware configuration diagram of a controller according to Embodiment 1.

A controller 30 for an internal combustion engine (hereinafter, referred to simply as the controller 30) according to Embodiment 1 will be explained with reference to the drawings. FIG. 1 is a schematic configuration diagram of the internal combustion engine 1, and FIG. 2 is a block diagram of the controller 30 according to Embodiment 1. The internal combustion engine 1 and the controller 30 are mounted in a vehicle; the internal combustion engine 1 functions as a driving-force source for the vehicle (wheels).

1. Configuration of Internal Combustion Engine 1

As shown in FIG. 1, the internal combustion engine 1 is provided with a combustion chamber 25 in which a fuel-air mixture is combusted. The internal combustion engine 1 is provided with an intake pipe 23 for supplying air to the combustion chamber 25 and an exhaust pipe 17 for discharging exhaust gas from the combustion chamber 25. The combustion chamber 25 is configured by a cylinder and a piston. Hereinafter, the combustion chamber 25 is also referred to the cylinder. The internal combustion engine 1 is a gasoline engine. The internal combustion engine 1 has a throttle valve 6 for opening and closing the intake pipe 23. The throttle valve 6 is an electronically controlled throttle valve which is opening/closing-driven by an electric motor controlled by the controller 30. The throttle valve 6 is provided with a throttle opening degree sensor 7 which generates an electric signal according to a throttle opening degree of the throttle valve 6.

In the intake pipe 23 at the upstream side of the throttle valve 6, there are provided an air flow sensor 3 which outputs an electric signal according to an intake air flow rate taken into the intake pipe 23, and an intake air temperature sensor 4 which outputs an electric signal according to a temperature of intake air. The temperature of intake air detected by the intake air temperature sensor 4 can be regarded as equal to an outside air temperature.

The internal combustion engine 1 has an EGR passage 21 which recirculates exhaust gas from the exhaust pipe 17 to the intake manifold 12, and an EGR valve 22 which opens and closes the EGR passage 21. The intake manifold 12 is a part of the intake pipe 23 at the downstream side of the throttle valve 6. The EGR valve 22 is an electronic controlled EGR valve which is opening/closing-driven by an electric motor controlled by controller 30. The EGR valve 22 is provided with an EGR opening degree sensor 27 which outputs an electric signal according to the opening degree of the EGR valve 22. "EGR" is an acronym for Exhaust Gas Recirculation. EGR that the exhaust gas recirculates via the EGR valve 22 is called as external EGR, and EGR that the exhaust gas remains in the combustion chamber by valve overlap of intake and exhaust valves is called as internal EGR. Hereinafter, external EGR is simply called as EGR.

In the intake manifold 12, there are provided a manifold pressure sensor 8 which outputs an electric signal according to a manifold pressure, which is a pressure of gas in the intake manifold 12, and a manifold temperature sensor 9 which outputs an electric signal according to a manifold temperature, which is a temperature of gas in the intake manifold 12.

The internal combustion engine 1 is provided with an injector 13 which supplies fuel to the combustion chamber 25. The injector 13 is provided in such a way as to inject a fuel directly into the combustion chamber 25. The injector 13 may be provided so as to inject fuel to a downstream side part of the intake manifold 12. The internal combustion engine 1 is provided with an atmospheric pressure sensor 2 which outputs an electric signal according to an atmospheric pressure.

An ignition plug for igniting a fuel-air mixture and an ignition coil 16 for supplying ignition energy to the ignition plug are provided on the top of the combustion chamber 25. A cylinder internal pressure sensor 29 which detects an internal cylinder pressure which is a pressure in the combustion chamber 25 is provided on the top of the combustion chamber 25. On the top of the combustion chamber 25, there are provided an intake valve 14 for adjusting an intake air amount to be taken from the intake pipe 23 into the combustion chamber 25 and an exhaust valve 15 for adjusting an exhaust gas amount to be exhausted the combustion chamber 25 to the exhaust pipe 17. The intake valve 14 is provided with an intake variable valve timing mechanism which makes the opening and closing timing thereof variable. The exhaust valve 15 is provided with an exhaust variable valve timing mechanism which makes the opening and closing timing thereof variable. Each of the variable valve timing mechanisms 14, 15 has an electric actuator. On the crankshaft of the internal combustion engine 1, there is provided a crank angle sensor 20 for generating an electric signal according to the rotation angle thereof. A knock sensor 28 is fixed to the cylinder block.

In the exhaust pipe 17, there is provided an air-fuel ratio sensor 18 which generates an electric signal according to an air-fuel ratio AF, which is the ratio of air to fuel in exhaust gas. A catalyst 19 for purifying exhaust gas is also provided in the exhaust pipe 17.

2. Configuration of Controller 30

Next, the controller 30 will be explained. The controller 30 is a controller whose control subject is the internal combustion engine 1. As shown in the block diagram of FIG. 2, the controller 30 is provided with control units such as a torque control unit 31, a torque interface unit 32, and an engine control unit 33. The respective control units 31 to 33 and the like of the controller 30 are realized by processing circuits included in the controller 30. Specifically, as shown in FIG. 2, the controller 30 includes, as processing circuits, an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, a communication circuit 94, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches and is provided with an A/D converter and the like for inputting output signals from the sensors and the switches to the arithmetic processor 90. The output circuit 93 is connected with electric loads and is provided with a driving circuit and the like for outputting a control signal from the arithmetic processor 90.

The communication circuit 94 is connected with external controllers, such as a transmission controller 95 which controls a transmission, a motor controller 96 which controls a motor provided in the hybrid vehicle, and a brake traction controller 97 which performs brake control and traction control, through a communication wire, and performs cable communication based on a communication protocol such as the CAN (Controller Area Network).

Then, the arithmetic processor 90 runs software items (programs) stored in the storage apparatus 91 such as a ROM and collaborates with other hardware devices in the controller 30, such as the storage apparatus 91, the input circuit 92, and the output circuit 93, so that the respective functions of the control units 31 to 33 included in the controller 50 are realized. Setting data items such as each function and constants to be utilized in the control units 31 to 33 are stored, as part of software items (programs), in the storage apparatus 91 such as a ROM.

In the present embodiment, the input circuit 92 is connected with the atmospheric pressure sensor 2, the air flow sensor 3, the intake air temperature sensor 4, the throttle position sensor 7, the manifold pressure sensor 8, the manifold temperature sensor 9, the air-fuel ratio sensor 18, the crank angle sensor 20, the accelerator opening degree sensor 26, the EGR opening degree sensor 27, the knock sensor 28, the cylinder internal pressure sensor 29, and the like. The output circuit 93 is connected with the throttle valve 6 (electric motor), the injector 13, the intake variable valve timing mechanism 14, the exhaust variable valve timing mechanism. 15, the ignition coil 16, the EGR valve 22 (the electric actuator), and the like. The controller 30 is connected with various kinds of unillustrated sensors, switches, actuators, and the like.

2-1. Torque Base Control

The controller 30 performs torque base control that controls the internal combustion engine 1 based on a target torque. The controller 30 is provided with the torque control unit 31, the torque interface unit 32, and the engine control unit 33 schematically, as mentioned above. The torque control unit 31 calculates the target torque. The torque interface unit 32 calculates target values of controlled variables of the internal combustion engine based on the target torque. The engine control unit 33 performs driving control of various kinds of electric loads based on the target values of controlled variables.

<Torque Control Unit 31>

The torque control unit 31 calculates a driver request torque which is an output torque that a driver requires on the internal combustion engine 1, based on the actual accelerator opening degree detected by the accelerator opening degree sensor 26. The torque control unit 31 calculates an idling torque which is an output torque necessary for maintaining rotational speed at idling operation. The torque control unit 31 calculates an external request torque which is an output torque required from the external controllers such as the transmission controller 95, the motor controller 96, and the brake traction controller 97. Then, the torque control unit 31 calculates the target torque by determining the priority among the driver request torque, the idling torque, and the external request torque (such calculation is also called as torque adjustment).

Here, the target torque contains a low response target torque Trqts and a high response target torque Trqtf. The low response target torque Trqts is an output torque required for the internal combustion engine without considering retarding the ignition timing; and the high response target torque Trqtf is an output torque required for the internal combustion engine including retarding the ignition timing. Normally, although the low response target torque Trqts and the high response target torque Trqtf coincide with each other, when there is a torque down request by retarding ignition timing, the high response target torque Trqtf becomes lower than the low response target torque Trqts.

The torque control unit 31 mainly calculates the low response target torque Trqts based on the larger one of driver request torque and the idling torque in a steady state, and calculates the high response target torque Trqtf based on the external request torque and the idling torque at load change.

<Torque interface unit 32>

The torque interface unit 32 performs interconversion between the target torque and the charging efficiency, and interconversion between the target torque and the ignition timing, based on the driving conditions of the internal combustion engine; and calculates a target charging efficiency Ect and a target ignition timing IGt to transmit to the engine control unit 33. The torque interface unit 32 calculates an actual output torque Trqr based on the driving conditions of the internal combustion engine to transmit to the torque control unit 31. Detailed processing of the torque interface unit 32 is described below.

<Driving Condition Detection Unit 330>

The engine control unit 33 is provided with a driving condition detection unit 330 that detects the driving conditions of the internal combustion engine. The driving condition detection unit 330 detects various kinds of driving conditions, based on the output signals of various kinds of sensors and the like. Specifically, the driving condition detection unit 330 detects an actual atmospheric pressure based on the output signal of the atmospheric pressure sensor 2; detects an actual intake air flow rate based on the output signal of the air flow sensor 3; detects an actual outside air temperature based on the output signal of the intake air temperature sensor 4; detects an actual throttle opening degree based on the output signal of the throttle position sensor 7; detects an actual manifold pressure based on the output signal of the manifold pressure sensor 8; detects an actual manifold temperature which is a gas temperature in the intake manifold 12 based on the output signal of the manifold temperature sensor 9 and the like; detects an actual air fuel ratio of exhaust gas based on the output signal of the air-fuel ratio sensor 18; detects an actual accelerator opening degree based on the output signal of the accelerator opening degree sensor 26; and detects an actual EGR opening degree based on the output signal of the EGR opening degree sensor 27.

The driving condition detection unit 330 detects a crank angle $\theta d$, a crank angle speed (hereinafter, referred to as an actual rotational speed Ner), and a crank angle acceleration $\alpha d$ based on the output signal of the crank angle sensor 20. The driving condition detection unit 330 detects an actual phase angle IVTr of the intake variable valve timing mechanism 14 (hereinafter, referred to as the intake VVT 14) and an actual phase angle EVTr of the exhaust gas variable valve timing mechanism 15 (hereinafter, referred to as the exhaust VVT 15), based on a phase difference between edge of a cam angle sensor (unillustrated) and the crank angle θd.

The driving condition detection unit 330 detects an in-cylinder intake air amount information which is information of an air amount taken into the combustion chamber 25. The driving condition detection unit 330 calculates an actual intake air amount [g/stroke] taken into the combustion chamber 25 and an actual charging efficiency Ecr [%] as the in-cylinder intake air amount information, based on the actual intake air flow rate, the actual rotational speed Ner, and the like. For example, the driving condition detection unit 330 calculates, as the actual intake air amount [g/stroke], a value obtained by applying filter processing which simulates a delay in the intake manifold to a value obtained by multiplying a stroke period according to the rotational speed Ne to the actual intake air flow rate [g/s]. Alternatively, the driving condition detection unit 330 may calculate the actual intake air amount [g/stroke] and the actual charging efficiency Ecr [%], based on the manifold pressure, the rotational speed Ne, and the like.

The driving condition detection unit 330 calculates an actual EGR amount [g/stroke] which is an actual exhaust gas recirculation amount taken into the combustion chamber 25, based on the EGR opening degree and the like. For example, the driving condition detection unit 330 calculates an actual EGR flow rate [g/s] which passes the EGR valve 22, based on the EGR opening degree, the manifold pressure, and the like; and calculates, as the actual EGR amount [g/stroke], a value obtained by applying filter processing to a value obtained by multiplying the stroke period to the actual EGR flow rate. The driving condition detection unit 330 calculates an actual EGR rate Regrr [%] which is a ratio of the actual EGR amount to the actual intake air amount.

The driving condition detection unit 330 detects an actual internal cylinder pressure Pcylr which is a pressure in the combustion chamber 25. The driving condition detection unit 330 detects the actual internal cylinder pressure Pcylr based on the output signal of the cylinder internal pressure sensor 29. Alternatively, the driving condition detection unit 330 may calculate the actual internal cylinder pressure Pcylr based on the crank angle θd and the crank angle acceleration αd calculated based on the output signal of the crank angle sensor 20. In this calculation, the method described in JP 6190936 B is used and described below. In order to calculate the actual internal cylinder pressure Pcylr, a crank angle sensor which can detect a crank angle with high precision may be provided additionally, similarly to JP 6190936 B.

<Intake Air Amount Control Unit 331>

The engine control unit 33 is provided with an intake air amount control unit 331 that controls intake air amount. The intake air amount control unit 331 calculates a target intake air amount from the target charging efficiency Ect, and calculates a target intake air flow rate from the target intake air amount. The engine control unit 33 calculates a target throttle opening degree based on the actual intake air flow rate and the actual manifold pressure so as to achieve the target intake air flow rate, and performs driving control of the electric motor of the throttle valve 6.

<Combustion Control Unit 334>

Figure 10:
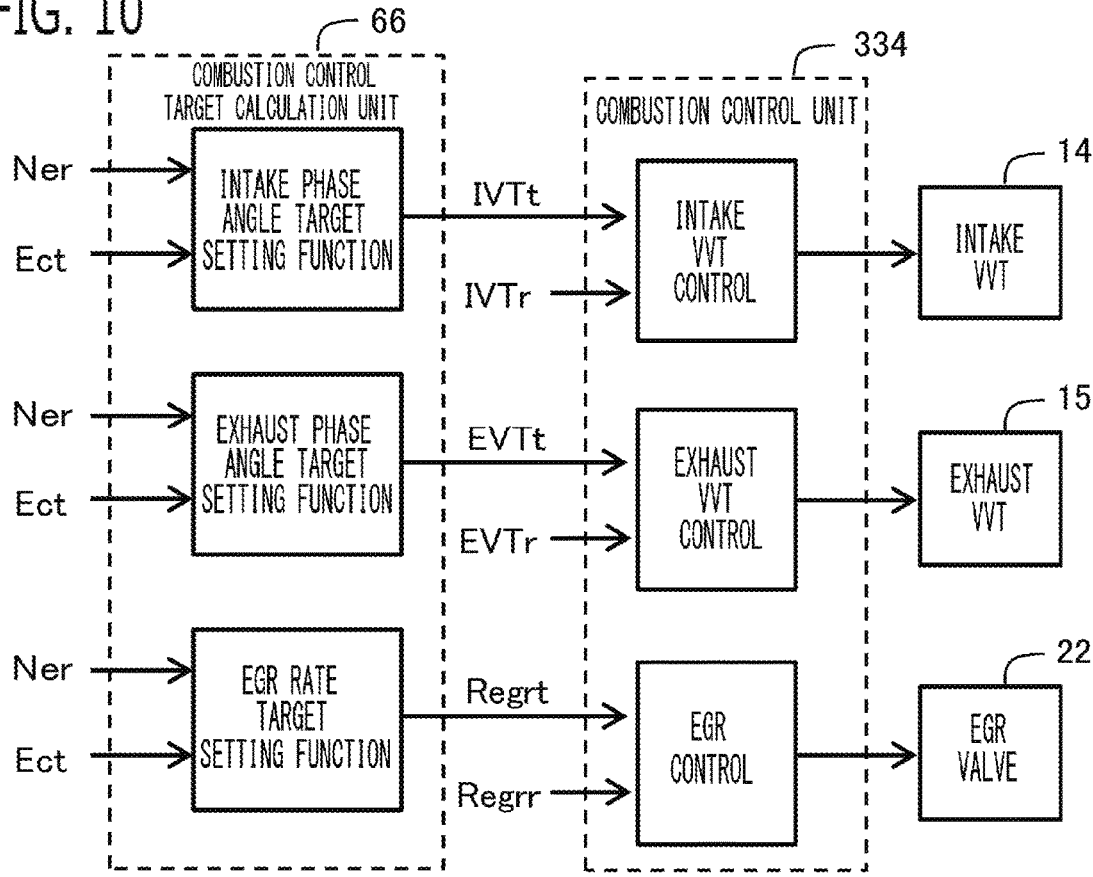
FIG. 10 is a block diagram for explaining processing of a combustion control target calculation unit and a combustion control unit according to Embodiment 1.

The engine control unit 33 is provided with a combustion control unit 334 that controls combustion operation mechanism for operating combustion state. In the present embodiment, the combustion operation mechanism is set to the EGR valve 22, the intake VVT 14, and the exhaust VVT 15. The combustion control unit 334 performs driving control of each combustion operation mechanism based on the target value of each combustion control state transmitted from the combustion control target calculation unit 66 described below, as shown in FIG. 10. The combustion control unit 334 calculates a target EGR opening degree so as to achieve the target EGR rate Regrt, and performs driving control of the electric actuator of the EGR valve 22. The combustion control unit 334 performs driving control of the electric actuator of the intake VVT 14 so as to achieve the target phase angle IVTt of the intake VVT 14 (hereinafter, referred to as the target intake phase angle IVTt). The combustion control unit 334 performs driving control of the electric actuator of the exhaust VVT 15 so as to achieve the target phase angle EVTt of the exhaust VVT 15 (hereinafter, referred to as the target exhaust phase angle EVTt.

<Fuel Control Unit 332>

The engine control unit 33 is provided with a fuel control unit 332 that controls fuel injection amount. The fuel control unit 332 calculates a fuel injection amount for achieving a target air fuel ratio based on the actual charging efficiency Ecr, and performs driving control of the injector 13.

<Ignition Control Unit 333>

The engine control unit 33 is provided with an ignition control unit 333 that performs energization to the ignition coil. The ignition control unit 333 determines a final ignition timing SA based on the target ignition timing IGt transmitted from the torque interface unit 32. When knock is detected by the knock sensor 28, the ignition control unit 333 calculates the final ignition timing SA by performing retard angle correction to the target ignition timing IGt so as not to cause knock. The ignition control unit 333 performs retard angle limitation that limits the ignition timing of retard side by a retard limit ignition timing IGrtd so that the final ignition timing SA is not set to retard side rather than the retard limit ignition timing IGrtd for preventing misfire. Then, the ignition control unit 333 performs energization control to the ignition coil 16 based on the final ignition timing SA. This final ignition timing SA becomes an actual ignition timing SA.

When performing feedback control of ignition timing, the ignition control unit 333 performs feedback control that changes the final ignition timing SA based on the actual internal cylinder pressure Pcylr. In the present embodiment, the ignition control unit 333 calculates a mass combustion rate MFB based on the actual internal cylinder pressure Pcylr and the crank angle θd. The mass combustion rate MFB is a ratio of burned mass to fuel mass per cycle, and is calculated for every crank angle θd. In calculation of the mass combustion rate MFB, the method described in JP 6190936 B is used and described below. Then, the ignition control unit 333 performs feedback control that changes the final ignition timing SA so that a crank angle θd of combustion gravity center at which the mass combustion rate MFB becomes 50% approaches a target combustion gravity center angle (for example, 10 degree after top dead center). The ignition control unit 333 does not perform feedback control of ignition timing, when the knock retard angle correction is performed.

2-2. Detailed Configuration of Torque Interface Unit 32

As mentioned above, the torque interface unit 32 performs interconversion between the target torque and the charging efficiency, and interconversion between the target torque and the ignition timing, based on the driving conditions of the internal combustion engine, and calculates a target charging efficiency Ect and a target ignition timing IGt. For that purpose, a torque characteristics function and an ignition timing setting function which are explained below are stored in the storage apparatus 91.

2-2-1. Ignition Timing Setting Function

The torque interface unit 32 stores the ignition timing setting function in which a relationship between preliminarily set kinds of driving conditions and a basic value of target ignition timing IGb is preliminarily set. In a driving condition where knock does not occur at a MBT ignition timing IGmbt (MBT: Minimum advance for the Best Torque) which is an ignition timing when the output torque becomes the maximum, the basic value of target ignition timing IGb is set to the MBT ignition timing IGmbt; and in a driving condition where knock occurs at the MBT ignition timing IGmbt, the basic value of target ignition timing IGb is set to a knock limit ignition timing IGknk which is a limit ignition timing of advance side when knock starts to occur.

The ignition timing setting function is a function in which a relationship between preliminarily set kinds of driving conditions including the charging efficiency Ec and the basic value of target ignition timing IGb is preliminarily set. The driving conditions which influence on the ignition timing when the output torque becomes the maximum change depending on the system structure of the internal combustion engine 1. In the present embodiment, the ignition timing setting function is a function in which a relationship between driving conditions of the rotational speed Ne, the charging efficiency Ec, the intake phase angle IVT, the exhaust phase angle EVT, and the EGR rate Regr, and the basic value of target ignition timing IGb is preliminarily set.

<Neural Network>

Figure 4:
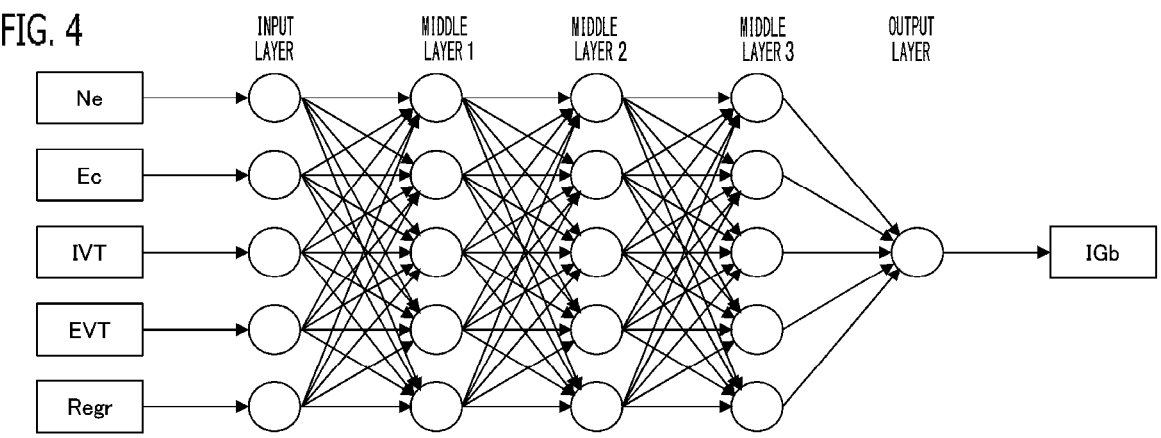
FIG. 4 is a figure showing an ignition timing setting function configured by FNN according to Embodiment 1.

When the system structure of the internal combustion engine 1 becomes complex, the ignition timing setting function becomes a complex function with many input variables. In the present embodiment, as shown in FIG. 4, the ignition timing setting function is configured by a feedforward propagation type neural network (FNN: Feedforward Neural Network). FNN has a structure in which units (also called as node, neuron) arranged in a hierarchical manner are connected between adjoining layers, and is a network configured so that information propagates from input side toward output side. In the calculation performed in the unit, weights are applied and biases are added to values inputted from respective units in a former layer, and then these become a total input to this unit; and this total input is inputted into an activation function, and its output becomes an output of the unit.

In order to use FNN configured by such units as approximation function, it is necessary to adjust the weights and the biases of each unit so that the input values to FNN and its output value become desired relationship. Many data sets of the input values and the output value which are called teacher data are previously prepared for this adjustment, and it is performed by applying a method called error back propagation method (back-propagation method). To adjust weights and biases in this way is called as learning of neural network; and when learning is performed well, FNN can be used as a general-purpose function which memorized the feature of teacher data.

Although it is considered that approximate precision is improved, as the number of layers of FNN becomes larger and the number of units included in a layer becomes larger; accuracy may be extremely deteriorated in different points from teacher data, depending on the condition of learning (this is called as over learning or excess adaptation); in such a case, it is necessary to adjust so as to obtain necessary approximate precision by stopping learning on the way to suppress over learning, and by increasing the number of teacher data. Although the above is an outline of FNN, since FNN and its learning method are well-known technology as explained in "Machine learning professional series deep learning", Takayuki Okaya, Kodansha, 2015, FNN is explained as well-known.

In an example shown in FIG. 4, as the configuration of FNN, five parameters of the rotational speed Ne, the charging efficiency Ec, the intake phase angle IVT, the exhaust phase angle EVT, and the EGR rate Regr are inputted into the input layer; there are three middle layers each of which has five units; and the basic value of target ignition timing IGb is outputted from the output layer. This configuration is exemplary, it may be configured so that environmental conditions, such as the intake-air temperature, the atmospheric pressure, and the manifold temperature, are inputted, and it may be configured so that the other driving conditions of the internal combustion engines such as the air-fuel ratio AF are inputted. If the system structure of the internal combustion engine is different, it may be configured so that the driving conditions of its system structure (for example, a variable valve lift, a variable compression ratio, and the like) are inputted. Also about middle layers, the number of units of each layer and the number of layers itself may be increased or decreased. These are the parameters which should be adjusted depending on approximate precision at learning of FNN performed beforehand.

Here, the example in which the basic value of target ignition timing IGb is directly calculated by one FNN is shown. However, two FNN of FNN for calculation of the MBT ignition timing IGmbt and FNN for calculation of the knock limit ignition timing IGknk may be provided; the MBT ignition timing IGmbt and the knock limit ignition timing IGknk are calculated by each FNN; and the ignition timing at the retard side out of these two ignition timings may be calculated as the basic value of target ignition timing IGb.

2-2-2. Torque Characteristics Function

The torque interface unit 32 stores the torque characteristics function in which a relationship between preliminarily set kinds of driving conditions and the output torque Trq is preliminarily set. Then, the torque interface unit 32 calculates the target values of controlled variables which realize the target torque, by using the torque characteristics function.

The torque characteristics function is a function in which a relationship between preliminarily set kinds of driving conditions including combustion control state and the output torque Trq is preliminarily set. The driving conditions which influence on the output torque change depending on the system structure of the internal combustion engine 1. In the present embodiment, the torque characteristics function is a function in which a relationship between driving conditions of the rotational speed Ne, the charging efficiency Ec, the intake phase angle IVT, the exhaust phase angle EVT, the EGR rate Regr, and the ignition timing IG, and the output torque Trq is preliminarily set.

When the system structure of the internal combustion engine 1 becomes complex, the torque characteristics function becomes a complex with many input variables. In the present embodiment, as shown in FIG. 5, the torque characteristics function is configured by the feedforward propagation type neural network (FNN).

Figure 5:
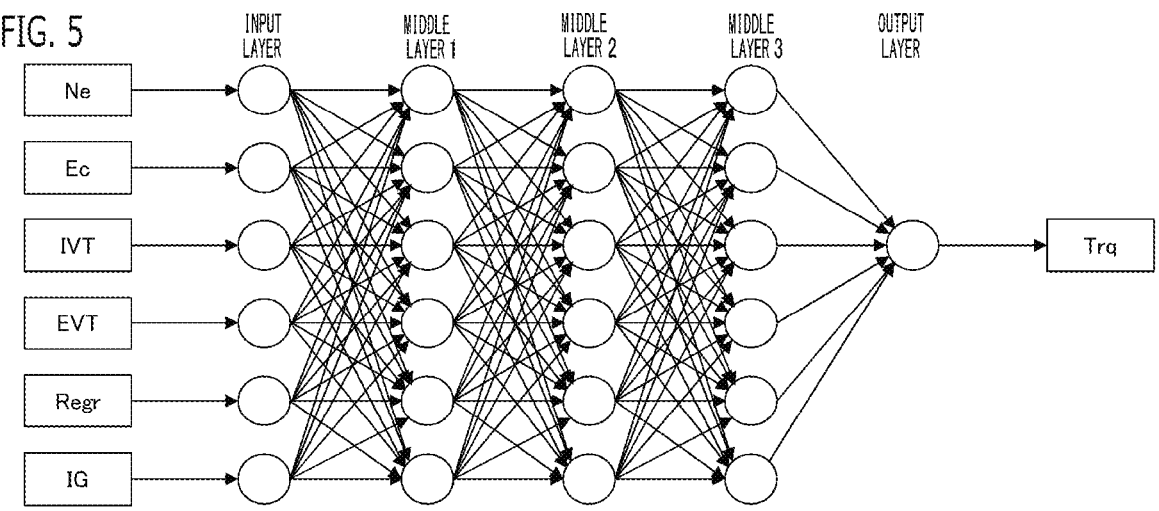
FIG. 5 is a figure showing a torque characteristics function configured by FNN according to Embodiment 1.

In an example shown in FIG. 5, as the configuration of FNN, six parameters of the rotational speed Ne, the charging efficiency Ec, the intake phase angle IVT, the exhaust phase angle EVT, the EGR rate Regr, and the ignition timing IG are inputted into the input layer; there are three middle layers each of which has six units; and the output torque Trq is outputted from the output layer.

This configuration is exemplary, it may be configured so that environmental conditions, such as the intake-air temperature, the atmospheric pressure, and the manifold temperature, are inputted, and it may be configured so that the other driving conditions of the internal combustion engines such as the air-fuel ratio AF are inputted. If the system structure of the internal combustion engine is different, it may be configured so that the driving conditions of its system structure (for example, a variable valve lift, a variable compression ratio, and the like) are inputted. Also about middle layers, the number of units of each layer and the number of layers itself may be increased or decreased. These are the parameters which should be adjusted depending on approximate precision at learning of FNN performed beforehand.

Here, the example in which the output torque Trq is directly calculated by FNN is shown. However, an indicated mean effective pressure or a thermal efficiency may be calculated by FNN; and the output torque Trq may be calculated by multiplying a stroke volume and the like to the indicated mean effective pressure, or the output torque Trq may be calculated by multiplying a heat amount of fuel and the like to the thermal efficiency.

2-2-3. Calculation of Actual Output Torque Trqr

The torque interface unit 32 is provided with an actual torque calculation unit 55 that calculates an actual output torque Trqr. The actual torque calculation unit 55 calculates the actual output torque Trqr which is the output torque corresponding to the present driving conditions (in this example, the actual rotational speed Ner, the actual charging efficiency Ecr, the actual intake phase angle IVTr, the actual exhaust phase angle EVTr, the actual EGR rate Regrr, and the actual ignition timing SA), by using the torque characteristics function. The calculated actual output torque Trqr is transmitted to the torque control unit 31.

2-2-4. Calculation of Target Ignition Timing IGt

The torque interface unit 32 is provided with a target ignition timing calculation unit 51 that calculates a target ignition timing IGt. In the present embodiment, as shown in a next equation, when the high response target torque Trqtf coincides with the low response target torque Trqts and there is no torque down request by retarding ignition timing, the target ignition timing calculation unit 51 calculates the basic value of target ignition timing IGb corresponding to the present driving conditions, as the target ignition timing IGt; and when the high response target torque Trqtf is lower than the low response target torque Trqts and there is a torque down request by retarding ignition timing, the target ignition timing calculation unit 51 calculates a target torque corresponding ignition timing IGtt corresponding to the high response target torque Trqtf, as the target ignition timing IGt.

1) When $Trqtf=Trqts$ $IGt=IGb$

2) When $Trqtf<Trqts$ $IGt=IGtt$  (1)

2-2-4-1. Calculation of Basic Value of Target Ignition Timing IGb

The target ignition timing calculation unit 51 calculates the basic value of target ignition timing IGb corresponding to the present driving conditions (in this example, the actual rotational speed Ner, the actual charging efficiency Ecr, the actual intake phase angle IVTr, the actual exhaust phase angle EVTr, and the actual EGR rate Regrr), by using the ignition timing setting function.

2-2-4-2. Calculation of Target Torque Corresponding Ignition Timing

The target ignition timing calculation unit 51 calculates the target torque corresponding ignition timing IGtt which realizes the target torque. In the present embodiment, the target ignition timing calculation unit 51 calculates the target torque corresponding ignition timing IGtt which realize the high response target torque Trqtf which is the output torque required for the internal combustion engine including retarding ignition timing.

If the ignition timing IG is changed little by little and the output torque Trq is calculated repeatedly using the torque characteristics function, the ignition timing IG which realizes the high response target torque Trqtf can be searched. However, if the calculation using the torque characteristics function is performed repeatedly, arithmetic load is increased. Especially, if system structure becomes complex and the torque characteristics function becomes complex, arithmetic load is increased significantly. Therefore, it is desired to lower the number of calculations using the torque characteristics function as much as possible.

Figure 6:
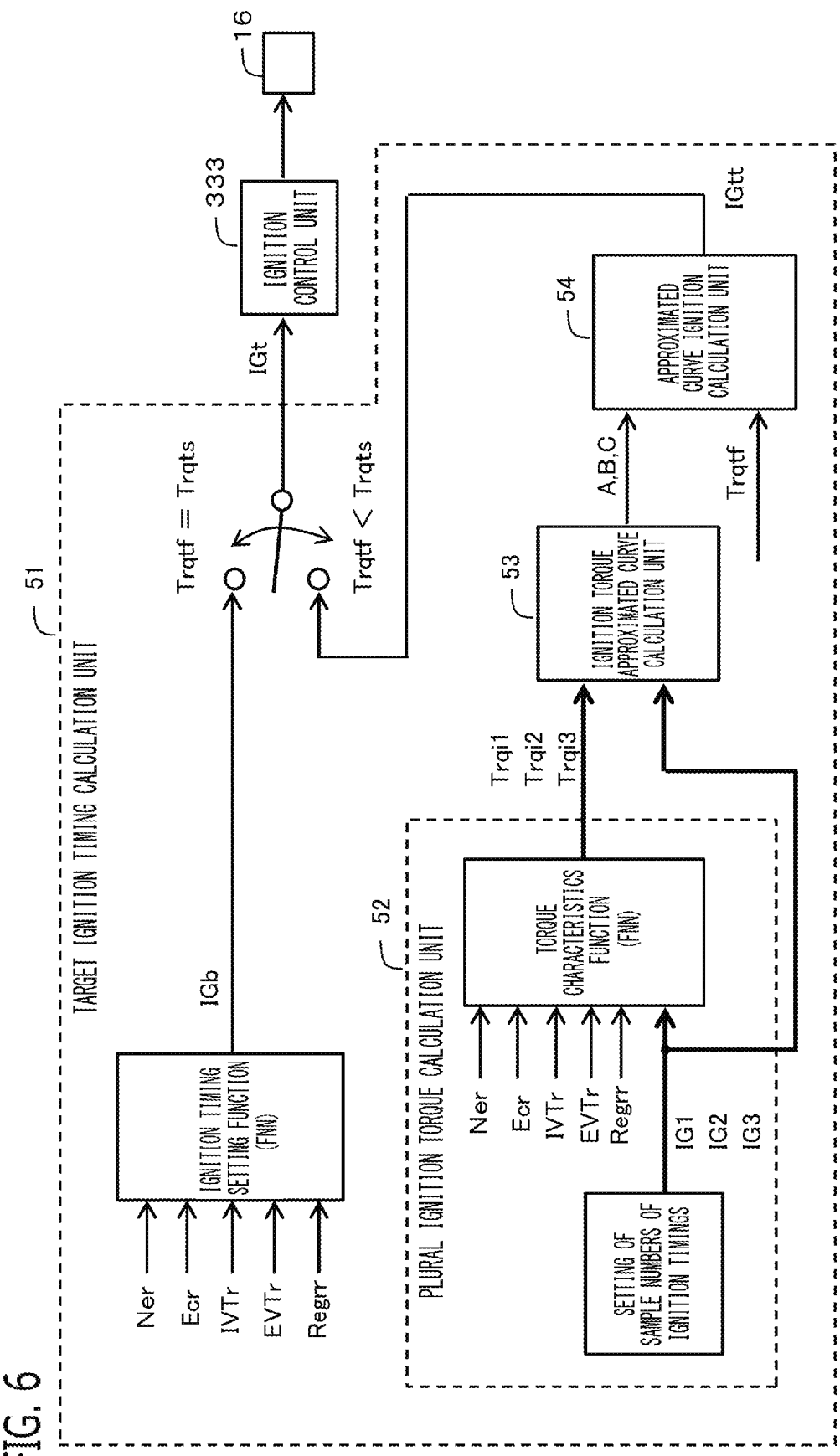
FIG. 6 is a block diagram for explaining calculation processing of a target ignition timing according to Embodiment 1.

Then, as shown in FIG. 6, the target ignition timing calculation unit 51 is provided with a plural ignition torque calculation unit 52, an ignition torque approximated curve calculation unit 53, and an approximated curve ignition calculation unit 54. The plural ignition torque calculation unit 52 calculates ignition sample numbers of ignition corresponding torques Trqi1, Trqi2 . . . which are the ignition sample numbers of output torques corresponding to the respective ignition sample numbers of ignition timings IG1, IG2 . . . which are preliminarily set to plural numbers, by using the torque characteristics function.

The ignition torque approximated curve calculation unit 53 calculates an ignition torque approximated curve which is an approximated curve approximating a relationship between the ignition sample numbers of the ignition timings IG1, IG2 . . . and the ignition sample numbers of the ignition corresponding torques Trqi1, Trqi2 . . . . The approximated curve ignition calculation unit 54 calculates the ignition timing corresponding to the target torque (in this example, the high response target torque Trqtf), as the target torque corresponding ignition timing IGtt, by using the ignition torque approximated curve.

According to this configuration, without performing the calculation using the torque characteristics function repeatedly to search the ignition timing corresponding to the target torque directly, the approximated curve is calculated based on the ignition sample numbers of calculation results of the torque characteristics function, and the ignition timing corresponding to the target torque is calculated using the approximated curve, therefore the calculation using the torque characteristics function can be reduced to the preliminarily set ignition sample numbers.

<Setting of Three Ignition Sample Numbers of Ignition Timings>

In the present embodiment, a case where the ignition sample numbers is set to three will be explained. That is to say, the calculation using the torque characteristics function is performed for each of the first sample of ignition timing IG1, the second sample of ignition timing IG2, and the third sample of ignition timing IG3, and the first sample of ignition corresponding torque Trqi1, the second sample of ignition corresponding torque Trqi2, and the third sample of ignition corresponding torque Trqi3 are calculated.

The plural ignition torque calculation unit 52 sets the first sample of ignition timing IG1, the second sample of ignition timing IG2, and the third sample of ignition timing IG3, to mutually different values within a combustible range. For example, as shown in a next equation, the plural ignition torque calculation unit 52 sets the first sample of ignition timing IG1 to the basic value of target ignition timing IGb, sets the third sample of ignition timing IG3 to the retard limit ignition timing IGrtd which is a setting limit of the ignition timing on the retard side, and sets the second sample of ignition timing IG2 to an intermediate value between the basic value of target ignition timing IGb and the retard limit ignition timing IGrtd.

$$IG1 = IGb, IG3 = IGrtd, IG2 = \frac{IGb + IGrtd}{2} \qquad (2)$$

<Calculation of Three Ignition Sample Numbers of Ignition Corresponding Torques>

The plural ignition torque calculation unit 52 calculates the first sample of ignition corresponding torque Trqi1 which is the output torque corresponding to the actual rotational speed Ner, the actual charging efficiency Ecr, the actual intake phase angle IVTr, the actual exhaust phase angle EVTr, the actual EGR rate Regrr, and the first sample of ignition timing IG1, by using the torque characteristics function. Next, the plural ignition torque calculation unit 52 calculates the second sample of ignition corresponding torque Trqi2 which is the output torque corresponding to the actual rotational speed Ner, the actual charging efficiency Ecr, the actual intake phase angle IVTr, the actual exhaust phase angle EVTr, the actual EGR rate Regrr, and the second sample of ignition timing IG2, by using the torque characteristics function. Then, the plural ignition torque calculation unit 52 calculates the third sample of ignition corresponding torque Trqi3 which is the output torque corresponding to the actual rotational speed Ner, the actual charging efficiency Ecr, the actual intake phase angle IVTr, the actual exhaust phase angle EVTr, the actual EGR rate Regrr, and the third sample of ignition timing IG3, by using the torque characteristics function.

<Calculation of Ignition Torque Approximated Curve>

Figure 7:
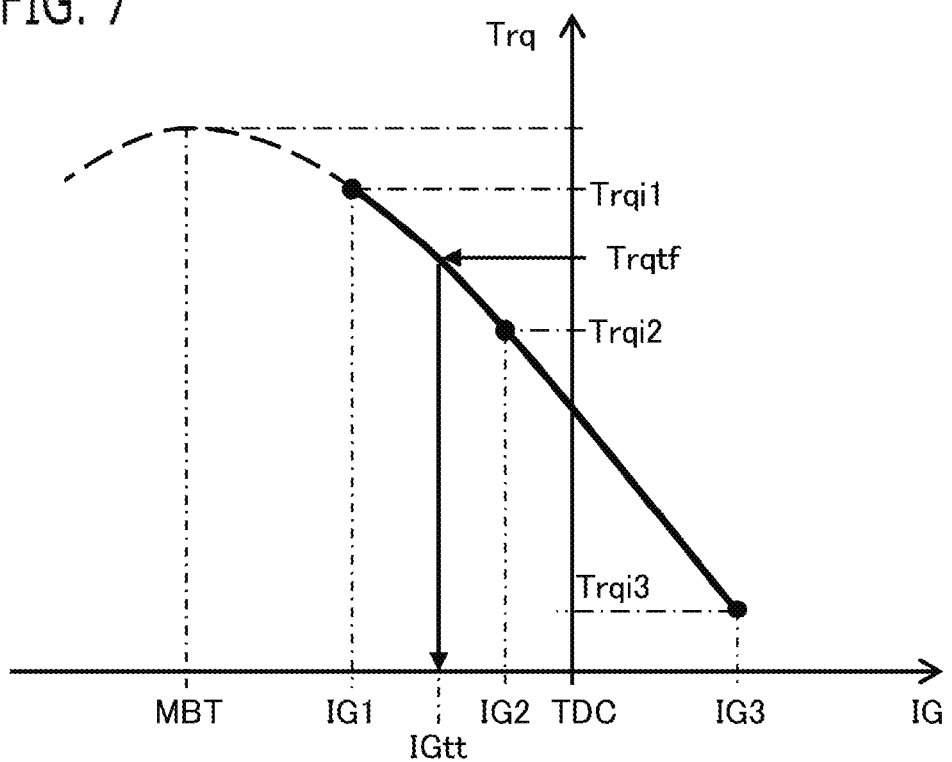
FIG. 7 is a figure for explaining an ignition torque approximated curve according to Embodiment 1.

The relationship between the first sample to the third sample of ignition timings IG1, IG2, IG3, and the first sample to the third sample of ignition corresponding torques Trqi1, Trqi2, Trqi3 is shown in FIG. 7. Generally, if the driving conditions other than the ignition timing are the same, it is considered that the relationship between the ignition timing and the torque can be approximated by a quadratic function (see the paragraph 0032 and the like of JP H11-351045 A).

Then, in the present embodiment, the ignition torque approximated curve is set to a quadratic function as shown in a next equation. The ignition torque approximated curve calculation unit 53 calculates coefficients A, B, C of respective terms of the ignition torque approximated curve which is set to the quadratic function, based on the ignition sample numbers of the ignition timings IG1, IG2 . . . and the ignition sample numbers of the ignition corresponding torques Trqi1, Trqi2 . . . .

$$Trq = A \times IG^2 + B \times IG + C \qquad (3)$$

In this quadratic function, if there are three points of relationship between the ignition timing IG and the output torque Trq, the three coefficients A, B, C can be calculated by substituting these to the equation (3) respectively and solving simultaneous equations. For example, the ignition torque approximated curve calculation unit 53 calculates the three coefficients A, B, C using a next equation.

$$\begin{bmatrix} A \\ B \\ C \end{bmatrix} = \begin{bmatrix} IG1^2 & IG1 & 1 \\ IG2^2 & IG2 & 1 \\ IG3^2 & IG3 & 1 \end{bmatrix}^{-1} \begin{bmatrix} Trqi1 \\ Trqi2 \\ Trqi3 \end{bmatrix} \qquad (4)$$

The ignition sample numbers may be preliminarily set to four or more numbers, four or more points of the relationship between the ignition timing IG and the output torque Trq are calculated, and by a method of regression analysis such as the least square method, the coefficients A, B, C of respective terms may be calculated.

<If Ignition Sample Numbers are Two>

Alternatively, the ignition sample numbers may be preliminarily set to two. In this case, as shown in a next equation, the ignition torque approximated curve calculation unit 53 sets the first sample of ignition timing IG1 to the MBT ignition timing IGmbt which is the ignition timing when the output torque becomes the maximum, and sets the second sample of ignition timing IG2 to the retard limit ignition timing IGrtd which is the setting limit of the ignition timing on the retard side. Similarly to the ignition timing setting function, the MBT ignition timing IGmbt is calculated using a function in which a relationship between preliminarily set kinds of driving conditions and the MBT ignition timing IGmbt is preliminarily set; and the function is configured by a neural network. Alternatively, as mentioned above, if two FNN of FNN for calculation of the MBT ignition timing IGmbt and FNN for calculation of the knock limit ignition timing IGknk are provided as the ignition timing setting function, the MBT ignition timing IGmbt calculated when calculating the basic value of target ignition timing IGb may be used.

$$IG1 = IGmbt, IG2 = IGrtd \qquad (5)$$

The plural ignition torque calculation unit 52 calculates the first sample of ignition corresponding torque Trqi1 corresponding to the MBT ignition timing IGmbt, by using the torque characteristics function, and calculates the second sample of ignition corresponding torque Trqi2 corresponding to the retard limit ignition timing IGrtd, by using a torque characteristics function.

Then, as shown in a next equation, the ignition torque approximated curve calculation unit 53 sets the first sample of ignition corresponding torque Trqi1 corresponding to the MBT ignition timing IGmbt, and the MBT ignition timing IGmbt, to extremums of the ignition torque approximated curve which is set to a the quadratic function.

$$Trq = A \times \left(IG + \frac{B}{2A}\right)^2 + C - \frac{B^2}{4A} \qquad (6)$$

$$\frac{B}{2A} = -IGmbt, \quad C - \frac{B^2}{4A} = Trqi1$$

Then, as shown in a next equation, the ignition torque approximated curve calculation unit 53 calculates the coefficients A, B, C of respective terms of the ignition torque approximated curve, based on the second sample of ignition corresponding torque Trqi2 corresponding to the retard limit ignition timing IGrtd, and the retard limit ignition timing IGrtd.

$$Trqi2 = A \times (IGrtd - IGmbt)^2 + Trqi1 \qquad (7)$$

$$A = \frac{Trqi2 - Trqi1}{(IGrtd - IGmbt)^2}$$

$$B = -IGmbt \times 2A$$

$$C = Trqi1 + \frac{B^2}{4A}$$

<Calculation of Target Torque Corresponding Ignition Timing Using Ignition Torque Approximated Curve>

As shown in a next equation, the approximated curve ignition calculation unit 54 calculates the ignition timing corresponding to the high response target torque Trqtf by solving the equation of the quadratic function and using the coefficient A, B, C, as the target torque corresponding ignition timing IGtt.

$$A \times IGtt^2 + B \times IGtt + (C - Trqtf) = 0 \qquad (8)$$

$$IGtt = \frac{-B + \sqrt{B^2 - 4 \times A \times (C - Trqtf)}}{2 \times A}$$

2-2-5. Calculation of Target Charging Efficiency Ect

The torque interface unit 32 is provided with a target intake air amount calculation unit 61 that calculates the target charging efficiency Ect. The target intake air amount calculation unit 61 calculates the target charging efficiency Ect which realizes the target torque. In the present embodiment, the target intake air amount calculation unit 61 calculates the target charging efficiency Ect which realizes the low response target torque Trqts which is the output torque required for the internal combustion engine without considering retarding the ignition timing.

If the charging efficiency Ec is changed little by little and the output torque Trq is calculated repeatedly using the torque characteristics function, the charging efficiency Ec which realizes the low response target torque Trqt can be searched. In this case, since the basic value of target ignition timing IGb is also changed when the charging efficiency Ec is changed, it is necessary to also calculate the basic value of target ignition timing IGb using the ignition timing setting function every time when the charging efficiency Ec is changed. However, if the calculation using the torque characteristics function and the calculation using the ignition timing setting function are performed repeatedly, arithmetic load is increased. Especially, if system structure becomes complex, and the torque characteristics function and the ignition timing setting function become complex, arithmetic load is increased significantly. Therefore, it is desired to lower the number of calculations using the torque characteristics function and the ignition timing setting function as much as possible.

Figure 8:
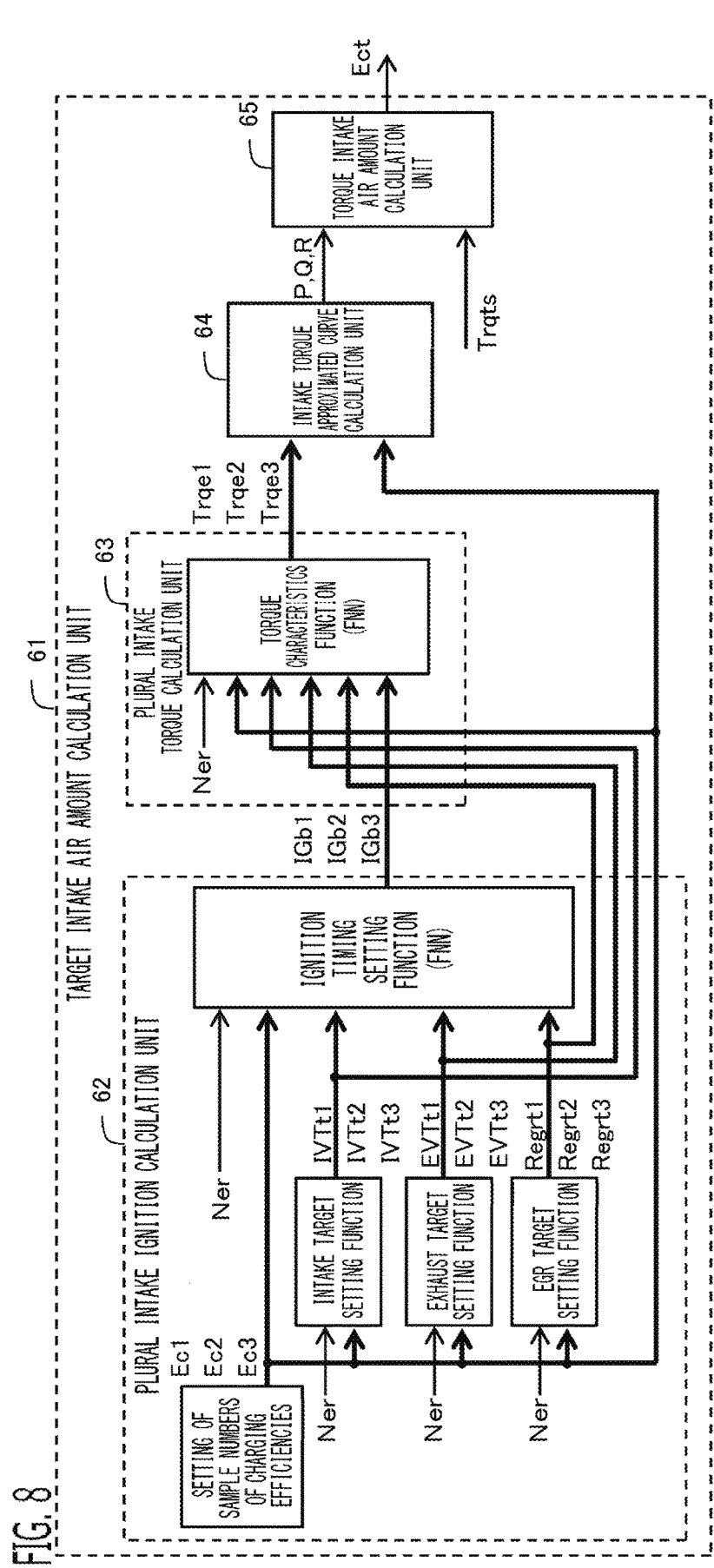
FIG. 8 is a block diagram for explaining calculation processing of a target charging efficiency according to Embodiment 1.

Then, as shown in FIG. 8, the target intake air amount calculation unit 61 is provided with a plural intake ignition calculation unit 62, a plural intake torque calculation unit 63, an intake torque approximated curve calculation unit 64, and a torque intake air amount calculation unit 65. The plural intake ignition calculation unit 62 calculates intake sample numbers of the basic values of target ignition timing IGb1, IGb2 . . . corresponding to the respective intake sample numbers of the charging efficiencies Ec1, Ec2 . . . which are preliminarily set to plural numbers, by using the ignition timing setting function.

The plural intake torque calculation unit 63 calculates the intake sample numbers of the intake ignition corresponding torques Trqe1, Trqe2 . . . which are the intake sample numbers of the output torques corresponding to the respective intake sample numbers of the charging efficiencies Ec1, Ec2 . . . and the respective intake sample numbers of the basic values of target ignition timing IGb1, IGb2 . . . , by using the torque characteristics function.

The intake torque approximated curve calculation unit 64 calculates an intake torque approximated curve which is an approximated curve approximating a relationship between the intake sample numbers of the charging efficiencies Ec1, Ec2 . . . and the intake sample numbers of the intake ignition corresponding torques Trqe1, Trqe2 . . . . The torque intake air amount calculation unit 65 calculates the charging efficiency corresponding to the target torque (in this example, the low response target torque Trqts), as the target charging efficiency Ect, by using the intake torque approximated curve.

According to this configuration, without performing the calculation using the torque characteristics function and the ignition timing setting function repeatedly to search the charging efficiency corresponding to the target torque directly, the approximated curve is calculated based on the intake sample numbers of calculation results of the torque characteristics function and the ignition timing setting function, and the charging efficiency corresponding to the target torque is calculated using the approximated curve, therefore the calculation using the torque characteristics function and the ignition timing setting function can be reduced to the preliminarily set intake sample numbers.

<Setting of Three Intake Sample Numbers of Charging Efficiencies>

In the present embodiment, a case where the intake sample numbers is set to three will be explained. As shown in a next equation, the plural intake ignition calculation unit 62 sets the actual charging efficiency Ecr to the first sample of charging efficiency Ec1. The plural intake ignition calculation unit 62 calculates a value according to a value obtained by multiplying a ratio of the low response target torque Trqts to the actual output torque Trqr, to the actual charging efficiency Ecr, as a target corresponding charging efficiency, and sets it to the third sample of charging efficiency Ec3. The plural intake ignition calculation unit 62 calculates an intermediate value between the actual charging efficiency Ecr (Ec1) and the target corresponding charging efficiency (Ec3), as a middle charging efficiency, and sets it to the second sample of charging efficiency Ec2.

$$Ec1 = Ecr \qquad (9)$$

$$Ec3 = Ke \times Ecr \times \frac{Trqts}{Trqr}$$

$$Ec2 = \frac{Ec1 + Ec3}{2}$$

Here, when "the actual output torque Trqr<the low response target torque Trqts", the adjustment factor Ke is set to a value about 1.2 to 1.5; and when "the actual output torque Trqr>the low response target torque Trqts", the adjustment factor Ke is set to a value about 0.7 to 0.9.

<Calculation of Target Values of Controlled Variables Other than Three Intake Sample Numbers of Ignition Timings>

If the charging efficiency Ec changes, not only the basic value of target ignition timing IGb but also the optimum values of other controlled variables of the internal combustion engines will change, and change of the controlled variables will influence on the output torque Trq. In the present embodiment, the plural intake ignition calculation unit 62 calculates target values of controlled variables of the internal combustion engines other than the ignition timing (in this example, the target intake phase angle IVTt, the target exhaust phase angle EVTt, the target EGR rate Regrt) corresponding to the respective intake sample numbers of the charging efficiencies Ec1, Ec2, Ec3, and uses these for the calculation using the ignition timing setting function.

Specifically, the plural intake ignition calculation unit 62 calculates the intake sample numbers of the target intake phase angles IVTt1, IVTt2, IVTt3 corresponding to the actual rotational speed Ner and the respective intake sample numbers of the charging efficiencies Ec1, Ec2, Ec3, by using an intake phase angle target setting function described below. The plural intake ignition calculation unit 62 calculates the intake sample numbers of the target exhaust phase angles EVTt1, EVTt2, EVTt3 corresponding to the actual rotational speed Ner and the respective intake sample numbers of the charging efficiencies Ec1, Ec2, Ec3, by using an exhaust phase angle target setting function described below. The plural intake ignition calculation unit 62 calculates the intake sample numbers of the target EGR rates Regrt1, Regrt2, Regrt3 corresponding to the actual rotational speed Ner and the respective intake sample numbers of the charging efficiencies Ec1, Ec2, Ec3, by using an EGR rate target setting function described below.

<Calculation of Three Intake Sample Numbers of Basic Values of Target Ignition Timing>

The plural intake ignition calculation unit 62 calculates the first sample of the basic value of target ignition timing IGb1 corresponding to the actual rotational speed Ner, the first sample of the charging efficiency Ec1, the first sample of the target intake phase angle IVTt1, the first sample of the target exhaust phase angle EVTt1, and the first sample of the target EGR rate Regrt1, by using the ignition timing setting function. Next, the plural intake ignition calculation unit 62 calculates the second sample of the basic value of target ignition timing IGb2 corresponding to the actual rotational speed Ner, the second sample of the charging efficiency Ec2, the second sample of the target intake phase angle IVTt2, the second sample of the target exhaust phase angle EVTt2, and the second sample of the target EGR rate Regrt2, by using the ignition timing setting function. Then, the plural intake ignition calculation unit 62 calculates the third sample of the basic value of target ignition timing IGb3 corresponding to the actual rotational speed Ner, the third sample of the charging efficiency Ec3, the third sample of the target intake phase angle IVTt3, the third sample of the target exhaust phase angle EVTt3, and the third sample of the target EGR rate Regrt3, by using the ignition timing setting function.

<Calculation of Three Intake Sample Numbers of Intake Ignition Corresponding Torques>

The plural intake torque calculation unit 63 calculates the first sample of the intake ignition corresponding torque Trqe1 corresponding to the actual rotational speed Ner, the first sample of the charging efficiency Ec1, the first sample of the target intake phase angle IVTt1, the first sample of the target exhaust phase angle EVTt1, the first sample of the target EGR rate Regrt1, and the first sample of the basic value of target ignition timing IGb1, by using the torque characteristics function. Next, the plural intake torque calculation unit 63 calculates the second sample of the intake ignition corresponding torque Trqe2 corresponding to the actual rotational speed Ner, the second sample of the charging efficiency Ec2, the second sample of the target intake phase angle IVTt2, the second sample of the target exhaust phase angle EVTt2, the second sample of the target EGR rate Regrt2, and the second sample of the basic value of target ignition timing IGb2, by using the torque characteristics function. Then, the plural intake torque calculation unit 63 calculates the third sample of the intake ignition corresponding torque Trqe3 corresponding to the actual rotational speed Ner, the third sample of the charging efficiency Ec3, the third sample of the target intake phase angle IVTt3, the third sample of the target exhaust phase angle EVTt3, the third sample of the target EGR rate Regrt3, and the third sample of the basic value of target ignition timing IGb3, by using the torque characteristics function.

<Calculation of Intake Torque Approximated Curve>

Figure 9:
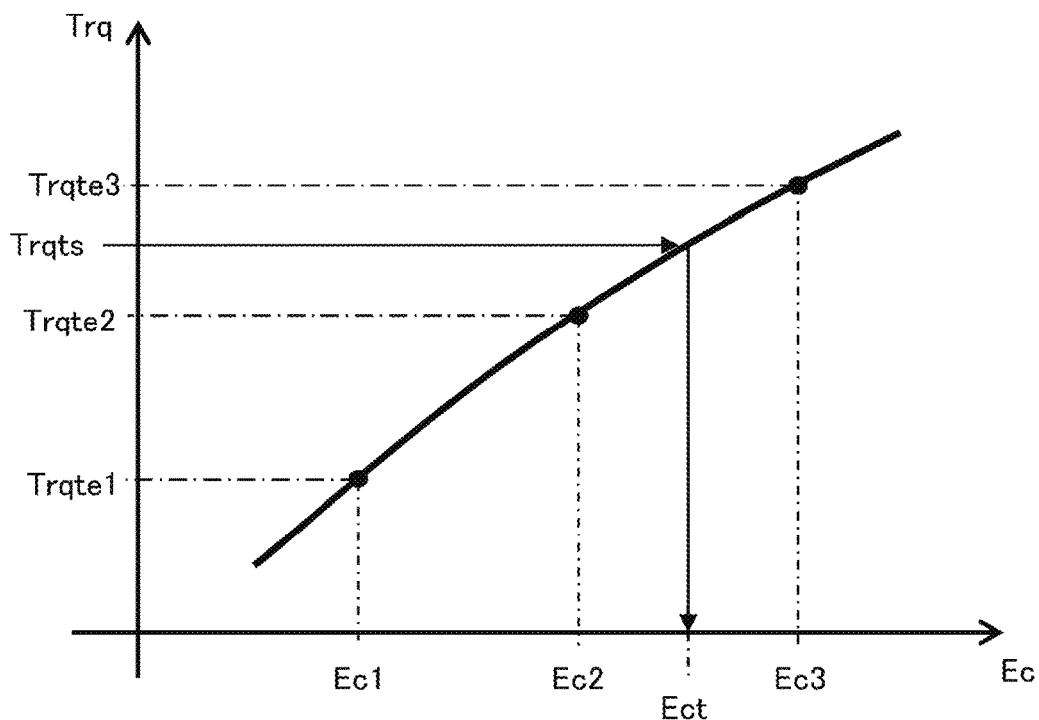
FIG. 9 is a figure for explaining an intake torque approximated curve according to Embodiment 1.

The relationship between the first sample to the third sample of the charging efficiencies Ec1, Ec2, Ec3, and the first sample to the third sample of the intake ignition corresponding torques Trqe1, Trqe2, Trqe3 is shown in FIG. 9. Generally, if the thermal efficiency is constant, the relationship between the charging efficiency and the output torque is proportional. However, since the thermal efficiency also changes if the ignition timing, the VVT phase angle, and the EGR rate change, it is considered that it is not proportional relationship strictly. Therefore, approximate precision will be increased if approximated by a quadratic function.

Then, in the present embodiment, the intake torque approximated curve is set to a quadratic function as shown in a next equation. The intake torque approximated curve calculation unit 64 calculates coefficients P, Q, R of respective terms of the intake torque approximated curve which is set to a quadratic function, based on the intake sample numbers of the charging efficiencies Ec1, Ec2 . . . and the intake sample numbers of the intake ignition corresponding torques Trqe1, Trqe2 . . . .

$$Trq = P \times Ec_2 + Q \times Ec + R \quad (10)$$

In this quadratic function, if there are three points of relationship between the charging efficiency Ec and the output torque Trq, the three coefficients P, Q, R can be calculated by substituting these to the equation (10) respectively and solving simultaneous equations. For example, the intake torque approximated curve calculation unit 64 calculates the three coefficients P, Q, R using a next equation.

$$\begin{bmatrix} P \\ Q \\ R \end{bmatrix} = \begin{bmatrix} Ec1^2 & Ec1 & 1 \\ Ec2^2 & Ec2 & 1 \\ Ec3^2 & Ec3 & 1 \end{bmatrix}^{-1} \begin{bmatrix} Trqe1 \\ Trqe2 \\ Trqe3 \end{bmatrix} \quad (11)$$

The intake sample numbers may be preliminarily set to four or more numbers, four or more points of the relationship between the charging efficiency Ec and the output torque Trq are calculated, and by a method of regression analysis such as the least square method, the coefficients P, Q, R of respective terms may be calculated.

<Calculation of Target Charging Efficiency Using Intake Torque Approximated Curve>

As shown in a next equation, the torque intake air amount calculation unit 65 calculates the charging efficiency corresponding to the low response target torque Trqts by solving the equation of the quadratic function and using the coefficients P, Q, R of respective terms, as the target charging efficiency Ect.

$$P \times Ect^2 + Q \times Ect + (R - Trqts) = 0 \qquad (12)$$

$$Ect = \frac{-Q + \sqrt{Q^2 - 4 \times P \times (R - Trqts)}}{2 \times P}$$

2-2-6. Calculation of Target Value of Combustion Control State

The torque interface unit 32 is provided with a combustion control target calculation unit 66 that calculates a target value of a combustion control state which is a control state of the combustion operation mechanism. As shown in FIG. 10, the combustion control target calculation unit 66 calculates the target value of the combustion control state, by using a combustion control target setting function in which a relationship between preliminarily set kinds of driving conditions and the target value of the combustion control state is set. In the present embodiment, the target EGR rate Regrt, the target intake phase angle IVTt, and the target exhaust phase angle EVTt are calculated as the target value of the combustion control state; and an EGR rate target setting function, an intake phase angle target setting function, and an exhaust phase angle target setting function are used as the combustion control target setting function.

The combustion control target calculation unit 66 calculates the target EGR rate Regrt corresponding to the actual rotational speed Ner and the target charging efficiency Ect, by using the EGR rate target setting function in which a relationship among the rotational speed Ne, the charging efficiency Ec, and the target EGR rate Regrt is preliminarily set. In the present embodiment, the EGR rate target setting function is configured by map data. The EGR rate target setting function may be configured by a neural network.

The combustion control target calculation unit 66 calculates the target intake phase angle IVTt corresponding to the actual rotational speed Ner and the target charging efficiency Ect, by using the intake phase angle target setting function in which a relationship among the rotational speed Ne, the charging efficiency Ec, and the target intake phase angle IVTt is preliminarily set. In the present embodiment, the intake phase angle target setting function is configured by map data. The intake phase angle target setting function may be configured by a neural network.

The combustion control target calculation unit 66 calculates the target exhaust phase angle EVTt corresponding to the actual rotational speed Ner and the target charging efficiency Ect, by using the exhaust phase angle target setting function in which a relationship among the rotational speed Ne, the charging efficiency Ec, and the target exhaust phase angle EVTt is preliminarily set. In the present embodiment, the exhaust phase angle target setting function is configured by map data. The exhaust phase angle target setting function may be configured by a neural network.

Figure 11:
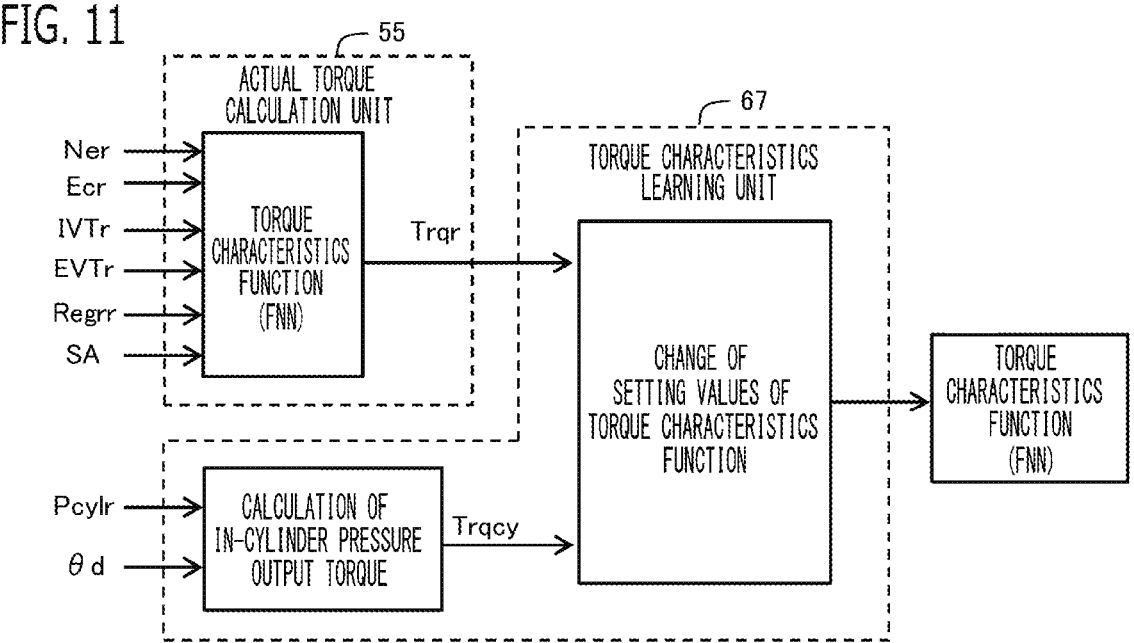
FIG. 11 is a block diagram for explaining processing of a torque characteristics learning unit according to Embodiment 1.

2-3. Learning of Each Function 2-3-1. Learning of Torque Characteristics Function As mentioned above, the actual output torque Trqr, the target ignition timing IGt, and the target charging efficiency Ect are calculated by using the torque characteristics function. However, if variation occurs in torque characteristics according to individual differences of the internal combustion engines and aging change, these calculation accuracy will be deteriorated. Then, the torque interface unit 32 is provided with a torque characteristics learning unit 67 that learns the torque characteristics function. As shown in FIG. 11, the torque characteristics learning unit 67 calculates the output torque Trqcy (hereinafter, referred to as an in-cylinder pressure output torque Trqcy) based on the actual internal cylinder pressure Pcylr, and changes setting values of the torque characteristics function so that the actual output torque Trqr calculated using the torque characteristics function approaches the in-cylinder pressure output torque Trqcy calculated based on the actual internal cylinder pressure Pcylr.

<Calculation of in-Cylinder Pressure Output Torque>

The torque characteristics learning unit 67 calculates the in-cylinder pressure output torque Trqcy based on the actual internal cylinder pressure Pcylr detected by the driving condition detection unit 330 mentioned above and the crank angle θd. Specifically, the torque characteristics learning unit 67 calculates a volume V of the combustion chamber 25 based on the crank angle θd; as shown in the next equation, calculates an area drawn by the P-V diagram of the actual internal cylinder pressure Pcylr and the volume V, and calculates an indicated mean effective pressure IMEP by dividing the area by the stroke volume Vc. Then, the torque characteristics learning unit 67 calculates the in-cylinder pressure output torque Trqcy based on the indicated mean effective pressure IMEP. Here, 4 n is a coefficient in the case of the four stroke cycle engine.

$$IMEP = \frac{\int Pcylr\, dV}{Vc} \qquad (13)$$

$$Trqcy = \frac{Vc}{4\pi} IMEP$$

<Setting of Teacher Signals>

The torque characteristics learning unit 67 sets the actual values of driving conditions, such as the actual rotational speed Ner, the actual charging efficiency Ecr, the actual intake phase angle IVTr, the actual exhaust phase angle EVTr, the actual EGR rate Regrr, and the actual ignition timing SA (the final ignition timing SA), which are used when calculating the actual output torque Trqr, to teacher signals of the input values; and sets the in-cylinder pressure output torque Trqcy calculated at these driving conditions, to teacher signals of the output value. Then, the torque characteristics learning unit 67 changes the weights and the biases of each unit of FNN of the torque characteristics function by the learning method, such as the error back propagation method (back propagation method), using the teacher signals of the input values and the output value.

At usual adaptation, adjustment of the weights and the biases of each unit are performed by the personal computer etc. using many teacher data (data set of the input values and the output value) prepared from the values measured previously. On the other hand, if learning is performed instantly using one teacher data prepared based on certain driving conditions during running, learning of the weights and the biases of each unit can be performed by the calculation processing capability of the controller 30; furthermore, if the prepared teacher data is learned successively for every driving condition which changes every moment, learning result which covers the driving points of wide range can be obtained, and automatic adaptation can be realized by controlling using its learning value. The well-known method disclosed in JP H11-351045 A and the like can be used for the learning method of FNN. Plural teacher data (for example, several tens) is stored, and learning of FNN may be repeatedly performed using plural teacher data.

If the output of FNN of the torque characteristics function is the indicated mean effective pressure IMEP, the indicated mean effective pressure IMEP calculated based on the actual internal cylinder pressure Pcylr may be set to the teacher signal of the output value.

In the transient state, the actual intake phase angle IVTr, the actual exhaust phase angle EVTr, the actual EGR rate Regrr, and the actual ignition timing SA, which are used as the input values, deviate from the target values, and fluctuate slightly. If learning is performed also including fluctuating state, learning will progress also at the driving points around the respective target values. When the range of this fluctuation is narrow, perturbation may be given to the respective target values, and learning may be performed at the driving points around the target values positively. But, the range of perturbation may be performed in a range which does not affect fuel efficiency and exhaust gas.

2-3-2. Learning of Ignition Timing Setting Function

Figure 12:
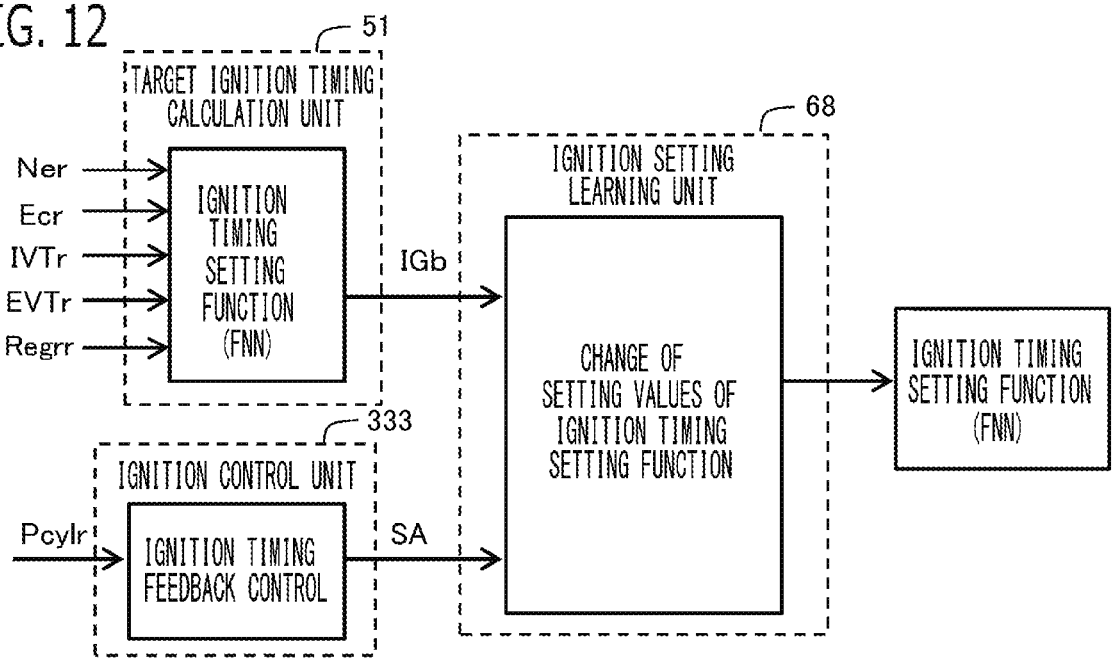
FIG. 12 is a block diagram for explaining processing of an ignition setting learning unit according to Embodiment 1.

The target ignition timing IGt and the target charging efficiency Ect are calculated using the ignition timing setting function. However, if variation occurs in the ignition timing characteristics by the individual difference of the internal combustion engine and the aging change, these calculation accuracy will be deteriorated. Then, the torque interface unit 32 is provided with an ignition setting learning unit 68. As shown in FIG. 12, when the feedback control of ignition timing is performed, the ignition setting learning unit 68 changes the setting values of the ignition timing setting function so that the basic value of target ignition timing IGb calculated by the target ignition timing calculation unit 51 using the ignition timing setting function approaches the final ignition timing SA (the actual ignition timing SA) calculated by the feedback control of ignition timing in the ignition control unit 333. When the knock retard angle correction is performed, the ignition setting learning unit 68 changes the setting values of the ignition timing setting function so that the basic value of target ignition timing IGb calculated by the target ignition timing calculation unit 51 using the ignition timing setting function approaches the ignition timing according to the final ignition timing SA calculated by the knock retard angle correction in the ignition control unit 333 (for example, the ignition timing set to about 1 degree or 2 degree retard side from the final ignition timing SA).

When the feedback control of ignition timing is performed, the ignition setting learning unit 68 sets the actual values of driving conditions, such as the actual rotational speed Ner, the actual charging efficiency Ecr, the actual intake phase angle IVTr, the actual exhaust phase angle EVTr, and the actual EGR rate Regrr, which are used when calculating the basic value of target ignition timing IGb, to the teacher signals of the input values; and sets the final ignition timing SA calculated by the feedback control of ignition timing at these driving conditions, to the teacher signal of the output value.

When the knock retard angle correction is performed, the ignition setting learning unit 68 sets the actual values of driving conditions, such as the actual rotational speed Ner, the actual charging efficiency Ecr, the actual intake phase angle IVTr, the actual exhaust phase angle EVTr, and the actual EGR rate Regrr, which are used when calculating the basic value of target ignition timing IGb, to the teacher signals of the input values; and sets the ignition timing according to the final ignition timing SA calculated by the knock retard angle correction at these driving conditions, to the teacher signal of the output value. Then, the ignition setting learning unit 68 changes the weights and the biases of each unit of FNN of the ignition timing setting function by the learning methods, such as the error back propagation method (back propagation method), using the teacher signals of the input values and the output value.

As mentioned above, if two FNN of FNN for calculation of the MBT ignition timing IGmbt and FNN for calculation of the knock limit ignition timing IGknk are provided as the ignition timing setting function, the ignition setting learning unit 68 may change the setting values of FNN for MBT ignition timing calculation so that the MBT ignition timing IGmbt outputted from FNN for MBT ignition timing calculation approaches the final ignition timing SA calculated by the feedback control of ignition timing; and may change the setting values of FNN for knock limit ignition timing calculation so that the knock limit ignition timing IGknk outputted from FNN for knock limit ignition timing calculation approaches the ignition timing according to the final ignition timing SA calculated by the knock retard angle correction.

2-3-3. Learning of Combustion Control Target Setting Function

If variation occurs in the torque characteristics by the individual difference of the internal combustion engine and the aging change, the target value of the combustion control state where the output torque becomes the maximum may also change. If the torque characteristics function which learned variation of the torque characteristics is used, the target value of the combustion control state where the output torque becomes the maximum can be searched. Then, the torque interface unit 32 is provided with a combustion control target learning unit 69. The combustion control target learning unit 69 learns the combustion control target setting function used for calculation of the target value of the combustion control state.

The combustion control target learning unit 69 calculates a plurality of output torques corresponding to respective plurality of combustion control states using the torque characteristics function. Then, the combustion control target learning unit 69 calculates a maximum torque combustion control state which is a combustion control state where the output torque becomes the maximum within a range of the plurality of combustion control states, based on the plurality of combustion control states and the plurality of output torques. The combustion control target learning unit 69 changes setting values of the combustion control target setting function so that the target value of the combustion control state calculated using the combustion control target setting function approaches the maximum torque combustion control state.

According to this configuration, by perturbation the combustion control state and calculating the plurality of the output torques using the torque characteristics function which learned variation of the torque characteristics, the maximum torque combustion control state where the output torque becomes the maximum can be searched. Then, by learning the combustion control target setting function by the maximum torque combustion control state, the target value of the combustion control state which is adapted to the varied torque characteristics can be set.

In the present embodiment, the plurality of combustion control states are set within a range before and after the actual value of the combustion control state. The target intake phase angle IVTt, the target exhaust phase angle EVTt, and the target EGR rate Regrt are calculated as the target value of the combustion control state; and the intake phase angle target setting function, the exhaust phase angle target setting function, and the EGR rate target setting function are used as a control target setting function. Each will be explained below.

2-3-3-1. Intake Phase Angle Target Setting Function

Figure 13:
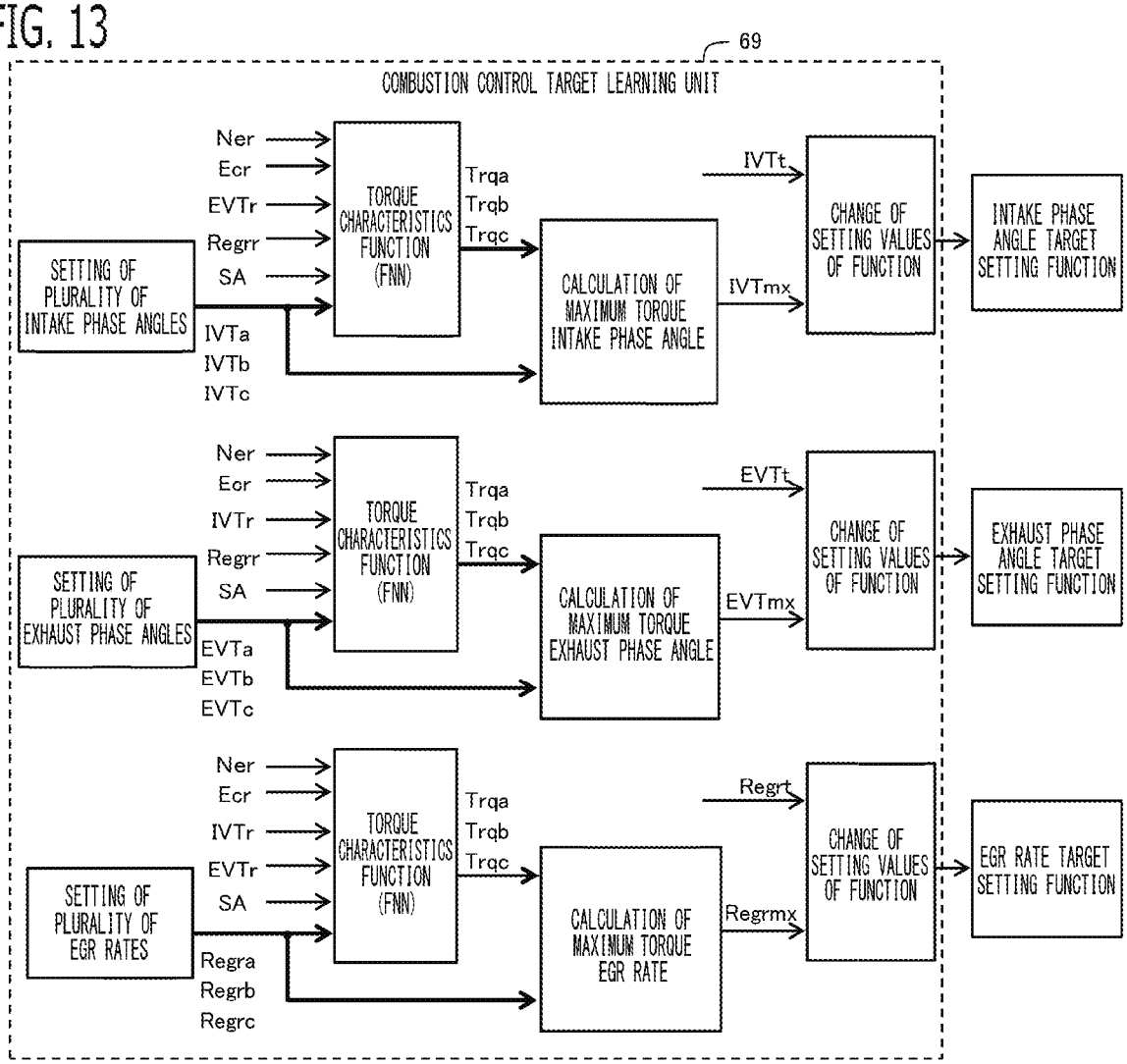
FIG. 13 is a block diagram for explaining processing of a combustion control target learning unit according to Embodiment 1.

First, learning of the intake phase angle target setting function will be explained. As shown in FIG. 13, the combustion control target learning unit 69 calculates a plurality of output torques (in this example, three output torques Trqa, Trqb, Trqc) corresponding to the actual rotational speed Ner, the actual charging efficiency Ecr, the actual exhaust phase angle EVTr, the actual EGR rate Regrr, the actual ignition timing SA, and respective plurality of intake phase angles (in this example, three intake phase angles IVTa, IVTb, IVTc) which are set within the range before and after the actual intake phase angle IVTr, by using the torque characteristics function. Then, the combustion control target learning unit 69 calculates a maximum torque intake phase angle IVTmx which is an intake phase angle at which the output torque becomes the maximum within the range of the plurality of intake phase angles (within the range from the minimum value of the plurality of intake phase angles to the maximum value of the plurality of intake phase angles), based on the plurality of intake phase angles and the plurality of output torques. The combustion control target learning unit 69 changes the setting values of the intake phase angle target setting function so that the target intake phase angle IVTt calculated using the intake phase angle target setting function approaches the maximum torque intake phase angle IVTmx.

In the present embodiment, as shown in a next equation, the combustion control target learning unit 69 sets the second intake phase angle IVTb to the actual intake phase angle IVTr, sets the first intake phase angle IVTa to a phase angle obtained by subtracting a preliminarily set perturbation phase angle A from the actual intake phase angle IVTr, and sets the third intake phase angle IVTc to a phase angle obtained by adding the perturbation phase angle A to the actual intake phase angle IVTr. The perturbation phase angle A is set to an angle about 1 degree to 3 degree.

$$IVTb=IVTr, IVTa=IVTr-\Delta\theta, IVTc=IVTr+\Delta\theta \quad (14)$$

The combustion control target learning unit 69 calculates the first output torque Trqa corresponding to the actual rotational speed Ner, the actual charging efficiency Ecr, the actual exhaust phase angle EVTr, the actual EGR rate Regrr, the actual ignition timing SA, and the first intake phase angle IVTa, by using the torque characteristics function. The combustion control target learning unit 69 calculates the third output torque Trqc corresponding to the actual rotational speed Ner, the actual charging efficiency Ecr, the actual exhaust phase angle EVTr, the actual EGR rate Regrr, the actual ignition timing SA, and the third intake phase angle IVTc, by using the torque characteristics function. The combustion control target learning unit 69 calculates the second output torque Trqb corresponding to the actual rotational speed Ner, the actual charging efficiency Ecr, the actual exhaust phase angle EVTr, the actual EGR rate Regrr, the actual ignition timing SA, and the second intake phase angle IVTb, by using the torque characteristics function. As the second output torque Trqb, the actual output torque Trqr calculated by the actual torque calculation unit 55 may be used.

Here, although the actual ignition timing SA is used for calculation of the first and the third output torques Trqa, Trqc, the optimal ignition timing will change when the intake phase angle changes. Then, the combustion control target learning unit 69 may calculate the basic value of target ignition timing IGb corresponding to the first intake phase angle IVTa using the ignition timing setting function, and calculate the first output torque Trqa by using this ignition timing instead of the actual ignition timing SA; and calculate the basic value of target ignition timing IGb corresponding to the third intake phase angle IVTc using the ignition timing setting function, and calculate the third output torque Trqc by using this ignition timing instead of the actual ignition timing SA.

Figure 14:
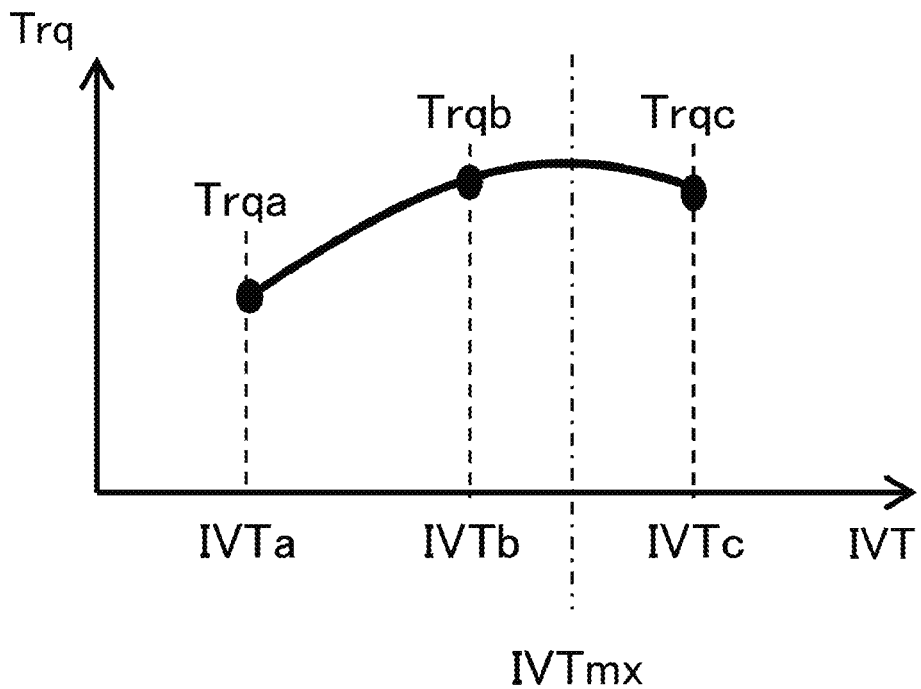
FIG. 14 is a figure for explaining calculation of a maximum torque intake phase angle according to Embodiment 1.

As shown in FIG. 14, the combustion control target learning unit 69 calculates the maximum torque intake phase angle IVTmx at which the output torque becomes the maximum within the range of the three intake phase angles IVTa, IVTb, IVTc (in this example, within the range from IVTa to IVTc), based on the three intake phase angles IVTa, IVTb, IVTc and the three output torques Trqa, Trqb, Trqc. In the example shown in FIG. 14, it is determined that the output torque becomes the maximum at a phase angle between the second intake phase angle IVTb and the third intake phase angle IVTc; and an intermediate value between the second intake phase angle IVTb and the third intake phase angle IVTc is calculated as the maximum torque intake phase angle IVTmx. Alternatively, the combustion control target learning unit 69 may calculate an approximated curve, such as a quadratic function, from three driving points, and may calculate the maximum torque intake phase angle IVTmx using the approximated curve. Alternatively, the combustion control target learning unit 69 may determine the maximum value among three output torques Trqa, Trqb, Trqc, and may calculate an intake phase angle corresponding to the maximum value, as the maximum torque intake phase angle IVTmx.

<Learning of Map Data>

Figure 15:
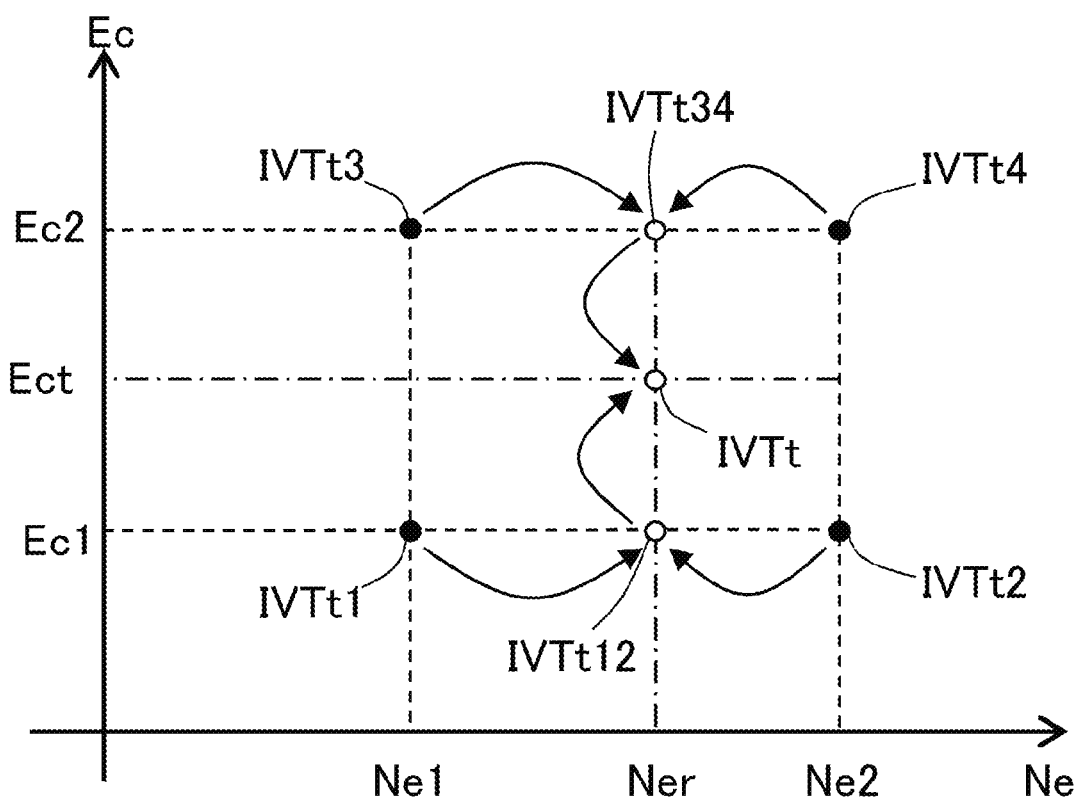
FIG. 15 is a figure for explaining processing using a map data according to Embodiment 1.

In the present embodiment, a case where the intake phase angle target setting function is set to map data will be explained. As partial schematic diagram of map data is shown in FIG. 15, The rotational speed Ne is set to the first map axis, and the charging efficiency Ec is set to the second map axis. The combustion control target learning unit 69 sets the actual rotational speed Ner and the target charging efficiency Ect to the input point, and searches four grid points of map axes which surround the input point. Since the actual charging efficiency Ecr is used for calculation of the maximum torque intake phase angle IVTmx, in order to coincide with this, the actual charging efficiency Ecr may be set to the input value instead of the target charging efficiency Ect. Then, the combustion control target learning unit 69 reads four target intake phase angles IVTt1, IVTt2, IVTt3, IVTt4 which are set at the respective four grid points from the map data. The combustion control target learning unit 69 interpolates the target intake phase angles IVTt1, IVTt2, IVTt3, IVTt4 of four grid points to calculate the target intake phase angle IVTt corresponding to the input point. Instead of calculating the target intake phase angle IVTt using the intake phase angle target setting function by the combustion control target learning unit 69, the calculating result of the combustion control target calculation unit 66 may be used.

For example, the combustion control target learning unit 69 interpolates between the target intake phase angle IVTt1 of the first grid point (Ne1, Ec1) and the target intake phase angle IVTt2 of the second grid point (Ne2, Ec1), by a ratio of the actual rotational speed Ner to the rotational speed Ne1 of the first grid point and the rotational speed Ne2 of the second grid point; and calculates the target intake phase angle IVTt12 at the point of Ner and Ec1. The combustion control target learning unit 69 interpolates between the target intake phase angle IVTt3 of the third grid point (Ne1, Ec2)

and the target intake phase angle IVTt4 of the fourth grid point (Ne2, Ec2), by a ratio of the actual rotational speed Ner to the rotational speed Ne1 of the third grid point and the rotational speed Ne2 of the fourth grid point; and calculates the target intake phase angle IVTt34 at the point of Ner and Ec2. Then, the combustion control target learning unit 69 interpolates between the target intake phase angle IVTt12 at the point of Ner and Ec1 and the target intake phase angles IVTt34 at the point of Ner and Ec2, by a ratio of the target charging efficiency Ect to the charging efficiency Ec1 of the first and the second grid points and the charging efficiency Ec2 of the second and the fourth grid points; and calculates the final target intake phase angle IVTt at the input point of Ner and Ect.

The combustion control target learning unit 69 changes the map data of four target intake phase angles IVTt1, IVTt2, IVTt3, IVTt4 which are set at four grid points surrounding the input point so that the target intake phase angle IVTt calculated using the map data approaches the maximum torque intake phase angle IVTmx. For example, as shown in a next equation, the combustion control target learning unit 69 calculates a deviation $\Delta IVT$ by subtracting the target intake phase angle IVTt calculated using the map data, from the maximum torque intake phase angle IVTmx; and adds a value obtained by multiplying a reflection coefficient Krf to the deviation $\Delta IVT$, to the target intake phase angles IVTt1, IVTt2, IVTt3, IVTt4 which are set at four grid points, and updates the map data at four grid points. The reflection coefficient Krf is set to a value about 0.01 to 0.1, for example.

$$\Delta IVT = IVTmx - IVTt$$

$$IVTt1 \leftarrow IVTt1 + Krf \times \Delta IVT$$

$$IVTt2 \leftarrow IVTt2 + Krf \times \Delta IVT$$

$$IVTt3 \leftarrow IVTt3 + Krf \times \Delta IVT$$

$$IVTt4 \leftarrow IVTt4 + Krf \times \Delta IVT \tag{15}$$

If learning is performed using one data for learning prepared based on certain driving conditions during running, learning of the map data corresponding to grid points can be performed by calculation processing capability of the controller 30; furthermore, if the data for learning is learned successively for every driving condition which changes every moment, learning result which covers the driving points of wide range can be obtained, and automatic adaptation can be realized by controlling using its learning value.

Plural data for learning (for example, several tens) is stored, and learning of map data may be repeatedly performed using plural data for learning. In the equation (15), although the same reflection coefficients Krf are multiplied to the deviations $\Delta IVT$, the reflection coefficient Krf of each grid point may be changed depending on a positional relationship between the input point and each grid point. Instead of updating directly the map data in which the initial values of the target intake phase angles IVTt are set, a map data for learning (initial values are zero) whose map axes and grid points are the same as the map data to be learned may be provided, learning may be performed by updating the map data for learning, and a total value of the output value of the map data in which the initial values are set and the output value of the map data for learning may be calculated as the target intake phase angle IVTt.

2-3-3-2. Exhaust Phase Angle Target Setting Function

Next, learning of the exhaust phase angle target setting function will be explained. As shown in FIG. 13, the combustion control target learning unit 69 calculates a plurality of output torques (in this example, three output torques Trqa, Trqb, Trqc) corresponding to the actual rotational speed Ner, the actual charging efficiency Ecr, the actual intake phase angle IVTr, the actual EGR rate Regrr, the actual ignition timing SA, and respective plurality of exhaust phase angles (in this example, three exhaust phase angles EVTa, EVTb, EVTc) which are set within the range before and after the actual exhaust phase angle EVTr, by using the torque characteristics function. Then, the combustion control target learning unit 69 calculates a maximum torque exhaust phase angle EVTmx which is the exhaust phase angle where the output torque becomes the maximum within a range of the plurality of exhaust phase angles, based on the plurality of exhaust phase angles and the plurality of output torques. The combustion control target learning unit 69 changes the setting values of the exhaust phase angle target setting function so that the target exhaust phase angle EVTt calculated using the exhaust phase angle target setting function approaches the maximum torque exhaust phase angle EVTmx.

In the present embodiment, as shown in a next equation, the combustion control target learning unit 69 sets the second exhaust phase angle EVTb to the actual exhaust phase angle EVTr, sets the first exhaust phase angle EVTa to a phase angle obtained by subtracting a preliminarily set perturbation phase angle A from the actual exhaust phase angle EVTr, and sets the third exhaust phase angle EVTc to a phase angle obtained by adding the perturbation phase angle A to the actual exhaust phase angle EVTr. The perturbation phase angle A is set to an angle about 1 degree to 3 degree.

$$EVTb = EVTr, EVTa = EVTr - \Delta\theta, EVTc = EVTr + \Delta\theta \tag{16}$$

The combustion control target learning unit 69 calculates the first output torque Trqa corresponding to the actual rotational speed Ner, the actual charging efficiency Ecr, the actual intake phase angle IVTr, the actual EGR rate Regrr, the actual ignition timing SA, and the first exhaust phase angle EVTa, by using the torque characteristics function. The combustion control target learning unit 69 calculates the third output torque Trqc corresponding to the actual rotational speed Ner, the actual charging efficiency Ecr, the actual intake phase angle IVTr, the actual EGR rate Regrr, the actual ignition timing SA, and the third exhaust phase angle EVTc, by using the torque characteristics function. The combustion control target learning unit 69 calculates the second output torque Trqb corresponding to the actual rotational speed Ner, the actual charging efficiency Ecr, the actual intake phase angle IVTr, the actual EGR rate Regrr, the actual ignition timing SA, and the second exhaust phase angle EVTb, by using the torque characteristics function. As the second output torque Trqb, the actual output torque Trqr calculated by the actual torque calculation unit 55 may be used.

Here, although the actual ignition timing SA is used for calculation of the first and the third output torques Trqa, Trqc, as mentioned above, the basic value of target ignition timing IGb corresponding to the first exhaust phase angle EVTa and the basic value of target ignition timing IGb corresponding to the third exhaust phase angle EVTc may be used.

Figure 16:
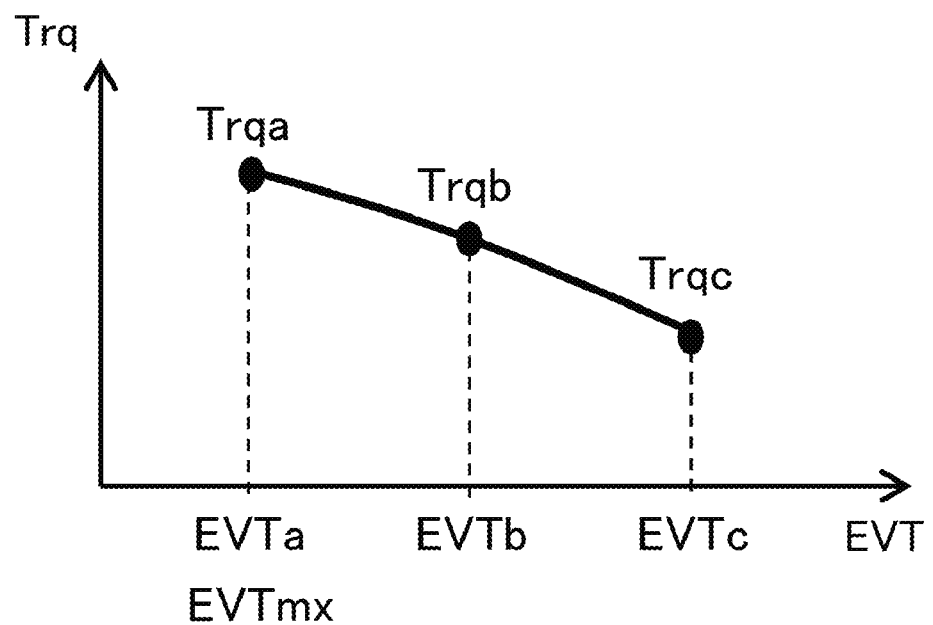
FIG. 16 is a figure for explaining calculation of a maximum torque exhaust phase angle according to Embodiment 1.

As shown in FIG. 16, the combustion control target learning unit 69 calculates the maximum torque exhaust phase angle EVTmx at which the output torque becomes the maximum within the range of the three exhaust phase angles EVTa, EVTb, EVTc (in this example, within the range from EVTa to EVTc), based on the three exhaust phase angles EVTa, EVTb, EVTc and the three output torques Trqa, Trqb, Trqc. In the example shown in FIG. 16, the first exhaust phase angle EVTa is calculated as the maximum torque exhaust phase angle EVTmx. Alternatively, the combustion control target learning unit 69 may calculate an approximated curves, such as a quadratic function, from three driving points, and may calculate the maximum torque exhaust phase angle EVTmx using the approximated curve. Alternatively, the combustion control target learning unit 69 may determine the maximum value among three output torques Trqa, Trqb, Trqc, and may calculate an exhaust phase angle corresponding to the maximum value, as the maximum torque exhaust phase angle EVTmx.

Although the exhaust phase angle target setting function is also map data, since the learning method of map data is the same as that of the intake phase angle target setting function mentioned above, explanation is omitted.

2-3-3-3. EGR Rate Target Setting Function

Next, learning of the EGR rate target setting function will be explained. As shown in FIG. 13, the combustion control target learning unit 69 calculates a plurality of output torques (in this example, three output torques Trqa, Trqb, Trqc) corresponding to the actual rotational speed Ner, the actual charging efficiency Ecr, the actual intake phase angle IVTr, the actual exhaust phase angle EVTr, the actual ignition timing SA, and respective plurality of EGR rates (in this example, three EGR rates Regra, Regrb, Regrc) which are set within the range before and after the actual EGR rate Regrr, by using the torque characteristics function. Then, the combustion control target learning unit 69 calculates a maximum torque EGR rate Regrmx which is the EGR rate where the output torque becomes the maximum within a range of the plurality of EGR rates, based on the plurality of EGR rates and the plurality of output torques. The combustion control target learning unit 69 changes the setting values of the EGR rate target setting function so that the target EGR rate Regrt calculated using the EGR rate target setting function approaches the maximum torque EGR rate Regrmx.

In the present embodiment, as shown in a next equation, the combustion control target learning unit 69 sets the second EGR rate Regrb to the actual EGR rate Regrr, sets the first EGR rate Regra to an EGR rate obtained by subtracting a preliminarily set perturbation rate $\Delta R$ from the actual EGR rate Regrr, and sets the third EGR rate Regrc to an EGR rate obtained by adding the perturbation rate $\Delta R$ to the actual EGR rate Regrr. The perturbation rate $\Delta R$ is set to a rate about 1% to 3%.

$$Regrb = regrr, Regra = Regrr - \Delta R, Regrc = Regrr + \Delta R \quad (17)$$

The combustion control target learning unit 69 calculates the first output torque Trqa corresponding to the actual rotational speed Ner, the actual charging efficiency Ecr, the actual intake phase angle IVTr, the actual exhaust phase angle EVTr, the actual ignition timing SA, and the first EGR rate Regra, by using the torque characteristics function. The combustion control target learning unit 69 calculates the third output torque Trqc corresponding to the actual rotational speed Ner, the actual charging efficiency Ecr, the actual intake phase angle IVTr, the actual exhaust phase angle EVTr, the actual ignition timing SA, and the third EGR rate Regrc, by using the torque characteristics function. Then, the combustion control target learning unit 69 calculates the second output torque Trqb corresponding to the actual rotational speed Ner, the actual charging efficiency Ecr, the actual intake phase angle IVTr, the actual exhaust phase angle EVTr, the actual ignition timing SA, and the second EGR rate Regrb, by using the torque characteristics function. As the second output torque Trqb, the actual output torque Trqr calculated by the actual torque calculation unit 55 may be used.

Here, although the actual ignition timing SA is used for calculation of the first and the third output torques Trqa, Trqc, as mentioned above, the basic value of target ignition timing IGb corresponding to the first EGR rate Regra and the basic value of target ignition timing IGb corresponding to the third EGR rate Regrc may be used.

The combustion control target learning unit 69 calculates the maximum torque EGR rate Regrmx at which the output torque becomes the maximum within the range of the three EGR rates Regra, Regrb, Regrc, based on the three EGR rates Regra, Regrb, Regrc and the three output torques Trqa, Trqb, Trqc. The combustion control target learning unit 69 may calculate an approximated curve, such as a quadratic function, from three driving points, and may calculate the maximum torque EGR rate Regrmx using the approximated curve. Alternatively, the combustion control target learning unit 69 may determine the maximum value among three output torques Trqa, Trqb, Trqc, and may calculate an EGR rate corresponding to the maximum value, as the maximum torque EGR rate Regrmx.

Although the EGR rate target setting function is also map data, since the learning method of map data is the same as that of the intake phase angle target setting function mentioned above, explanation is omitted.

<Learning by Feedback Control Value in Combustion Period>

It is known that combustion will become slow and combustion period will become long if the EGR rate is increased. Then, the combustion control unit 334 may perform feedback control that changes the target EGR rate Regrt so that a crank angle interval, in which the mass combustion rate MFB calculated from the actual internal cylinder pressure Pcylr becomes within a preliminarily set ratio range, approaches the target angle interval (for example, 10% to 90%). In this case, the combustion control target learning unit 69 may set the target EGR rate Regrt or the actual EGR rate Regrr when the actual angle interval coincides with the target angle interval, to the maximum torque EGR rate Regrmx; and may change the setting values of the EGR rate target setting function so that the target EGR rate Regrt calculated using the EGR rate target setting function approaches the maximum torque EGR rate Regrmx.

Although the target angle interval may be preliminarily set; since the combustion variation rate COV will become large if the EGR rate becomes large and the combustion period becomes long too much, the target angle interval may be set according to the magnitude of the combustion variation rate COV. The combustion variation rate COV is calculated by dividing a standard deviation of the indicated mean effective pressure IMEP by an average value.

As mentioned above, although there are two kinds of methods of the method using the feedback control value in the combustion period, and the method using the learned torque characteristics function, one of methods may be used or both methods may be used. If both methods are used, in order to give priority to improvement of fuel efficiency, a value obtained by upper-limiting the maximum torque EGR rate Regrmx calculated using the torque characteristics function by the EGR rate at feedback control in the combustion period may be used for learning of the EGR rate target setting function.

2-4. Detection of Actual Internal Cylinder Pressure Using Crank Angle Information The driving condition detection unit 330 calculates the combustion gas pressure torque Tb generated by combustion, by use of an equation of motion of a rotation system of the crankshaft containing piston, connecting rod, and crank of the internal combustion engine 1, based on the crank angle θd and the crank angle acceleration αd; and estimates an internal cylinder pressure Pcylb of the cylinder b which is burning based on the combustion gas pressure torque Tb and the crank angle θd.

The equation of motion of the rotation system of the crankshaft containing piston, connecting rod, and crank of the internal combustion engine 1 can be expressed by a next equation.

$$I \cdot \alpha d = \sum_{j=1}^{L} \{(Pcyl_j \cdot Sp + mp \cdot \alpha p_j) \cdot R_j\} - Tex \quad (18)$$

$$R_j = r \cdot (\sin\theta d_j + \tan\phi_j \cdot \cos\theta d_j)$$

Here, I is an inertia moment of crankshaft; Pcylj is the cylinder internal pressure of the j-th cylinder; Sp is a project area of a top face of the piston; mp is a mass of the piston; αpj is an acceleration of the piston of the j-th cylinder; Rj is a conversion factor which converts a force generated at the piston of the j-th cylinder into a torque around the crankshaft; Tex is an external load torque transmitted to the crankshaft from outside, such as friction, load of auxiliary machine, and driving resistance. L is a number of the cylinders, and L is three (L=3) in the present embodiment. R is a radius of the crank; θdj is a crank angle on the basis of the top dead center of the piston of the j-th cylinder; φj is an angle of the connecting rod of the j-th cylinder and is determined based on a connecting rod ratio which is a ratio of crank length and connecting rod length, and the crank angle θdj.

The driving condition detection unit 330 calculates an acceleration αpj of the piston of the each cylinder j, based on the geometrical relation of the connecting rod and the crank which changes according to the crank angle θdj of the each cylinder j, and the crank angle acceleration αd. The driving condition detection unit 330 calculates a conversion factor Rj of the each cylinder j based on the crank angle θdj of the each cylinder j.

The cylinder internal pressure Pcylj in the stroke other than the latter half of the compression stroke and the expansion stroke, in which combustion is performed, is a pressure according to the pressure in the intake manifold 12, the atmospheric pressure, and the crank angle θdj. The driving condition detection unit 330 estimates a cylinder internal pressure Pcylubj of the each unburnt cylinder j which is in the intake stroke, the compression stroke (except the latter half), or the exhaust stroke, based on the pressure in the intake manifold 12, the atmospheric pressure, and the crank angle θdj. When the b-th cylinder is in the latter half of the compression stroke and the expansion stroke, and combustion is performed, the equation (18) can be transformed like a next equation. Here, Pcylb is the cylinder internal pressure of the combustion cylinder b; Pcylubj is the cylinder internal pressure of the each unburnt cylinder j (j!=b).

$$I \cdot \alpha d = (Pcyl_b \cdot Sp + mp \cdot \alpha p_b) \cdot R_b + \quad (19)$$

$$\sum_{j=1, j \neq b}^{L} \{(Pcylub_j \cdot Sp + mp \cdot \alpha p_j) \cdot R_j\} - Tex$$

Since the first term of the right side of the equation (19) becomes zero when the piston of the combustion cylinder b is located at the top dead center, by rearranging the equation (19) with regarding to the external load torque Tex, it becomes like a next equation. It is assumed that the external load torque Tex is a constant value estimated at the top dead center, since the external load torque Tex does not change wildly for 1 cycle.

$$Tex = \sum_{j=1, j \neq b}^{L} \{(Pcylub_j \cdot Sp + mp \cdot \alpha p_j) \cdot R_j\} - I \cdot \alpha d \quad (20)$$

By use of the equation (20), the driving condition detection unit 330 estimates an external load torque Tex, based on the cylinder internal pressure Pcylubj, the acceleration αpj of the piston, and the conversion factor Rj of the each unburnt cylinder j, and the crank angle acceleration αd, when the piston of the combustion cylinder b is at the top dead center.

A next equation is obtained by rearranging an equation (19) with regarding to "Pcylb×Sp×Rb" which is corresponding to the combustion gas pressure torque Tb generated in the crankshaft 2 by combustion.

$$T_b = Pcyl_b \cdot Sp \cdot R_b \quad (21)$$

$$= I \cdot \alpha d - mp \cdot \alpha p_b \cdot R_b -$$

$$\sum_{j=1, j \neq b}^{L} \{(Pcylub_j \cdot Sp + mp \cdot \alpha p_j) \cdot R_j\} + Tex$$

The driving condition detection unit 330 estimates the combustion gas pressure torque Tb, based on the crankshaft angle θd and the crank angle acceleration αd, by use of the equation of motion of the rotation system of the crankshaft shown in the equation (21). At this time, as mentioned above, the driving condition detection unit 330 calculates the acceleration αpb of the piston and the conversion factor Rb of the combustion cylinder b; the cylinder internal pressure Pcylubj, the acceleration αpj of the piston, and the conversion factor Rj of the each unburnt cylinder j; and the external load torque Tex.

Then, the driving condition detection unit 330 calculates the cylinder internal pressure Pcylb of the combustion cylinder b by dividing the combustion gas pressure torque Tb by the project area Sp of the piston and the conversion factor Rb of the combustion cylinder b, as shown in a next equation.

$$Pcyl_b = \frac{T_b}{Sp \cdot R_b} \quad (22)$$

2-5. Calculation of Mass Combustion Rate

The ignition control unit 333 calculates a heat release rate dQ/dθ per unit crank angle using a next equation. Here, κ is a ratio of specific heat; Vb is a cylinder volume of the combustion cylinder b. The ignition control unit 333 calculates the cylinder volume Vb and a cylinder volume change rate dVb/dθ per unit crank angle, based on the crank angle θdb of the combustion cylinder b, and the geometrical relation of the connecting rod and the crank.

$$\frac{dQ}{d\theta} = \frac{\kappa}{\kappa-1} Pcy1_b \cdot \frac{dV_b}{d\theta} + \frac{1}{\kappa-1} V_b \frac{dPcy1_b}{d\theta} \quad (23)$$

By use of a next equation, the ignition control unit 333 calculates the mass combustion rate MFB of the each crank angle θdb by dividing the momentary integral value, which integrated with the heat release rate dQ/dθ from a combustion start angle θ0 to the crank angle θdb, by a total integral value Q0, which integrated with the heat release rate dQ/dθ over a whole combustion angle section.

$$MBF(\theta d_b) = \frac{\int_{\theta_0}^{\theta d_b} \frac{dQ}{d\theta} d\theta}{Q_0} \quad (24)$$

2-6. Flowchart

Figure 17:
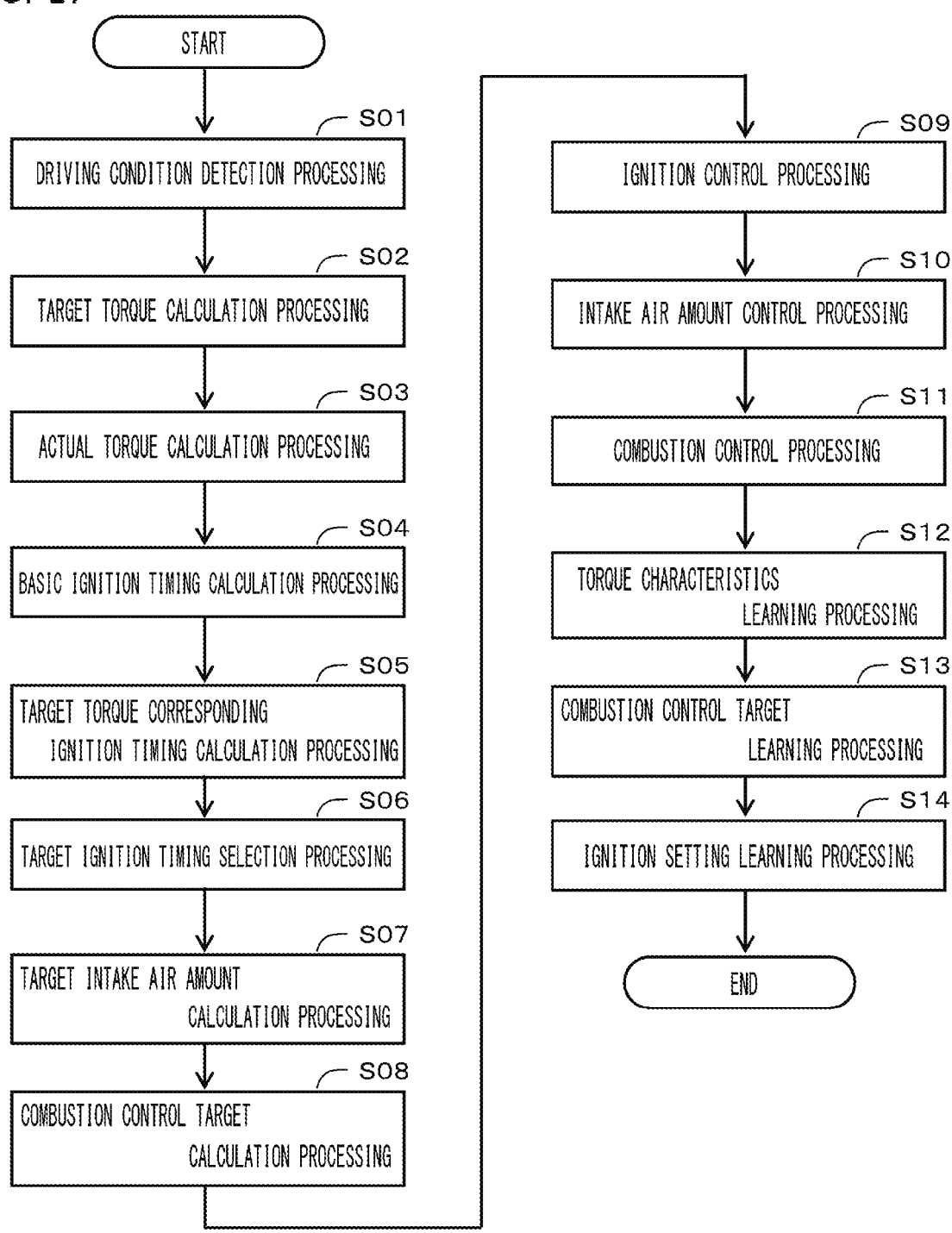
FIG. 17 is a flowchart for explaining a learning processing of a torque characteristics function, an ignition timing setting function, and a combustion control target setting function according to Embodiment 1.

The procedure (the control method of the internal combustion engine 1) of schematic processing of the controller 30 concerning learning of the torque characteristics function, the ignition timing setting function, and the combustion control target setting function will be explained based on the flow chart shown in FIG. 17. The processing represented in the flowchart in FIG. 17 is recurrently implemented, for example, every predetermined operation cycle while the arithmetic processor 90 implements software (a program) stored in the storage apparatus 91.

In the step S01, as mentioned above, the driving condition detection unit 330 implements driving condition detection processing that detects various kinds of driving conditions, such as the actual rotational speed Ner, the actual charging efficiency Ecr, the actual intake phase angle IVTr, the actual exhaust phase angle EVTr, the actual EGR rate Regrr, and the actual internal cylinder pressure Pcylr. In the step S02, as mentioned above, the torque control unit 31 implements target torque calculation processing that calculates the target torque (in this example, the low response target torque Trqts, the high response target torque Trqtf). In the step S03, as mentioned above, the actual torque calculation unit 55 implements actual torque calculation processing that calculates the actual output torque Trqr corresponding to the present driving conditions, by using the torque characteristics function.

In the step S04, as mentioned above, the target ignition timing calculation unit 51 implements basic ignition timing calculation processing that calculates the basic value of target ignition timing IGb corresponding to the present driving conditions, by using the ignition timing setting function. In the step S05, as mentioned above, the target ignition timing calculation unit 51 implements target torque corresponding ignition timing calculation processing that calculates the target torque corresponding ignition timing IGtt corresponding to the target torque (in this example, the high response target torque Trqtf), by using the torque characteristics function. Then, in the step S06, the target ignition timing calculation unit 51 implements target ignition timing selection processing that calculates the basic value of target ignition timing IGb calculated in the step S04 as the target ignition timing IGt when there is no torque down request by retarding ignition timing; and calculates the target torque corresponding ignition timing IGtt calculated in the step S05 as the target ignition timing IGt when there is the torque down request by retarding ignition timing.

In the step S07, as mentioned above, the target intake air amount calculation unit 61 implements target intake air amount calculation processing that calculates the target charging efficiency Ect, by using the ignition timing setting function and the torque characteristics function. In the step S08, as mentioned above, the combustion control target calculation unit 66 implements combustion control target calculation processing that calculates the target value of the combustion control state (in this example, the target EGR rate Regrt, the target intake phase angle IVTt, and the target exhaust phase angle EVTt), by using the combustion control target setting function.

In the step S09, as mentioned above, the ignition control unit 333 implements ignition control processing that determines the final ignition timing SA based on the target ignition timing IGt, and performs energization control to the ignition coil 16 based on the final ignition timing SA. In this time, as mentioned above, the ignition control unit 333 performs feedback control that changes the final ignition timing SA based on the actual internal cylinder pressure Pcylr when performing feedback control of ignition timing; and calculates the final ignition timing SA by performing knock retard angle correction when the knock occurs.

In the step S10, as mentioned above, the intake air amount control unit 331 implements intake air amount control processing that controls the air amount taken into the cylinder based on the target charging efficiency Ect. In the step S11, as mentioned above, the combustion control unit 334 implements combustion control processing that controls the combustion operation mechanism based on the target value of the combustion control state.

In the step S12, as mentioned above, the torque characteristics learning unit 67 implements torque characteristics learning processing that calculates the in-cylinder pressure output torque Trqcy based on the actual internal cylinder pressure Pcylr; and changes the setting values of the torque characteristics function so that the actual output torque Trqr calculated using the torque characteristics function in the step S03 approaches the in-cylinder pressure output torque Trqcy.

In the step S13, as mentioned above, the combustion control target learning unit 69 implements combustion control target learning processing that calculates the plurality of output torques corresponding to the respective plurality of combustion control states using the torque characteristics function; calculates the maximum torque combustion control state where the output torque becomes the maximum within the range of the plurality of combustion control states, based on the plurality of combustion control states and the plurality of output torques; and changes the setting values of the combustion control target setting function so that the target value of the combustion control state calculated using the combustion control target setting function approaches the maximum torque combustion control state.

In the step S14, as mentioned above, the ignition setting learning unit 68 implements ignition setting learning processing that changes the setting values of the ignition timing setting function so that the basic value of target ignition timing IGb calculated using the ignition timing setting function in the step S04 approaches the ignition timing changed by the feedback control of ignition timing based on the actual internal cylinder pressure Pcylr.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In the above-mentioned Embodiment 1, there has been explained the case where the torque characteristics function and the ignition timing setting function are configured by the neural network. However, embodiments of the present disclosure are not limited to the foregoing case. That is to say, one or both of the torque characteristics function and the ignition timing setting function may be configured by other functions, such as map data and an approximated curve.

(2) In the above-mentioned Embodiment 1, there has been explained the case where the combustion control target setting functions, such as the EGR rate target setting function, the intake phase angle target setting function, and the exhaust phase angle target setting function, are configured by map data. However, embodiments of the present disclosure are not limited to the foregoing case. That is to say, each combustion control target setting function may be configured by other functions, such as a neural network.

(3) In the above-mentioned Embodiment 1, there has been explained the case where the combustion operation mechanisms are the intake VVT 14, the exhaust VVT 15, and the EGR valve 22; the target intake phase angle IVTt, the target exhaust phase angle EVTt, and the target EGR rate Regrt are calculated as the target value of the combustion control state; and the intake phase angle target setting function, the exhaust phase angle target setting function, and the EGR rate target setting function are used as the control target setting function. However, embodiments of the present disclosure are not limited to the foregoing case. That is to say, the combustion operation mechanism may be changed depending on the system structure of the internal combustion engine, and may be a variable valve lift mechanism, a variable compression ratio mechanism, a turbocharger, a swirl control valve, a tumble control valve, and the like; the target value of the combustion control state may be a target valve lifting amount, a target compression ratio, a target supercharging pressure, a target swirl control valve opening degree, a target tumble control valve opening degree, and the like; and the control target setting function may be a function which sets each target value.

(4) In the above-mentioned Embodiment 1, there has been explained the case where the internal combustion engine 1 is a gasoline engine. However, embodiments of the present disclosure are not limited to the foregoing case. That is to say, the internal combustion engine 1 may be various kinds of internal combustion engines, such as an engine which performs HCCI combustion (Homogeneous-Charge Compression Ignition Combustion).

Although the present disclosure is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present disclosure. For example, at least one of the constituent components may be modified, added, or eliminated.

What is claimed is:

1. A controller for an internal combustion engine comprising at least one processor configured to implement:
    a driving condition detector that detects driving conditions of the internal combustion engine including an internal cylinder pressure which is a pressure in a combustion chamber;
    a target ignition timing calculator that calculates a basic value of target ignition timing corresponding to present driving conditions, by using an ignition timing setting function in which a relationship between preliminarily set kinds of driving conditions and the basic value of target ignition timing is set;
    an ignition controller that performs feedback control which changes ignition timing based on an actual value of the internal cylinder pressure; and
    an ignition setting learning calculator that changes setting values of the ignition timing setting function so that the basic value of target ignition timing calculated using the ignition timing setting function approaches the ignition timing changed by the feedback control.

2. The controller for the internal combustion engine according to claim 1, wherein the ignition timing setting function is configured by a neural network, and
    wherein the ignition setting learning calculator changes setting values of the neural network as the setting values of the ignition timing setting function.

3. A control method for an internal combustion engine comprising:
    a driving condition detecting that detects driving conditions of the internal combustion engine including an internal cylinder pressure which is a pressure in a combustion chamber;
    a target ignition timing calculating that calculates a basic value of target ignition timing corresponding to present driving conditions, by using an ignition timing setting function in which a relationship between preliminarily set kinds of driving conditions and the basic value of target ignition timing is set;
    an ignition controlling that performs feedback control which changes ignition timing based on an actual value of the internal cylinder pressure; and
    an ignition setting learning that changes setting values of the ignition timing setting function so that the basic value of target ignition timing calculated using the ignition timing setting function approaches the ignition timing changed by the feedback control.

* * * * *